(12) United States Patent
Nishimura

(10) Patent No.: US 8,984,924 B2
(45) Date of Patent: Mar. 24, 2015

(54) METAL MEMBER MANUFACTURING METHOD, INDENTER AND METAL MEMBER MANUFACTURING APPARATUS

(75) Inventor: Toshihiko Nishimura, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 412 days.

(21) Appl. No.: 13/119,471

(22) PCT Filed: Apr. 16, 2009

(86) PCT No.: PCT/JP2009/057651
§ 371 (c)(1),
(2), (4) Date: Mar. 17, 2011

(87) PCT Pub. No.: WO2010/035538
PCT Pub. Date: Apr. 1, 2010

(65) Prior Publication Data
US 2011/0162430 A1   Jul. 7, 2011

(30) Foreign Application Priority Data

Sep. 29, 2008 (JP) .................................. 2008-250258

(51) Int. Cl.
*B21J 11/00* (2006.01)
*B23P 9/02* (2006.01)
*B23P 25/00* (2006.01)
*C21D 7/02* (2006.01)

(52) U.S. Cl.
CPC ................. *B23P 9/025* (2013.01); *B23P 25/00* (2013.01); *C21D 7/02* (2013.01); *C21D 2221/10* (2013.01); *C21D 2261/00* (2013.01)
USPC ............................................................ 72/404

(58) Field of Classification Search
CPC .................................. B23P 9/025; B23P 25/00
USPC .................. 72/404, 405.03, 414, 442; 83/552
See application file for complete search history.

(56) References Cited

U.S. PATENT DOCUMENTS 4,154,083 A   5/1979   Rothenberger
(Continued)

FOREIGN PATENT DOCUMENTS

| JP | 7-500773 | 1/1995 |
| JP | 2002-506740 | 3/2002 |

(Continued)

OTHER PUBLICATIONS

Canadian Decision to Grant a Patent issued Mar. 17, 2014 in corresponding Canadian Patent Application No. 2,738,773.

(Continued)

*Primary Examiner* — Teresa M Ekiert
(74) *Attorney, Agent, or Firm* — Wenderoth, Lind & Ponack, L.L.P.

(57) ABSTRACT

A metal member manufacturing method is achieved by pressing a second region of a metal material without pressing a first region of the metal material, and pressing the first region without pressing the second region. The metal material has a hole formation region in which one through-hole is to be formed. The first region and the second region are contained in the hole formation region.

16 Claims, 18 Drawing Sheets

(56) References Cited

U.S. PATENT DOCUMENTS

| | | | |
|---|---|---|---|
| 6,389,865 | B1 | 5/2002 | Easterbrook |
| 6,675,688 | B2 * | 1/2004 | Ostini .............................. 83/552 |
| 6,742,376 | B2 | 6/2004 | Easterbrook et al. |
| 6,994,003 | B2 * | 2/2006 | Farrell et al. ....................... 83/13 |
| 7,131,310 | B2 | 11/2006 | Easterbrook et al. |
| 2001/0052254 | A1 | 12/2001 | Easterbrook et al. |
| 2003/0213280 | A1 | 11/2003 | Easterbrook et al. |
| 2004/0211235 | A1 | 10/2004 | Todaka et al. |
| 2005/0016245 | A1 | 1/2005 | Easterbrook et al. |

FOREIGN PATENT DOCUMENTS

| | | |
|---|---|---|
| JP | 2003-522026 | 7/2003 |
| JP | 2005-270489 | 10/2005 |
| JP | 2008-137073 | 6/2008 |

OTHER PUBLICATIONS

Extended European Search Report mailed Jul. 4, 2013 in corresponding European Patent Application No. 09815956.9.
Japanese Decision to Grant a Patent issued Mar. 6, 2013 in corresponding Japanese Patent Application No. 2008-250258 with English Translation.
International Search Report issued Jul. 28, 2009 in International (PCT) Application No. PCT/JP2009/057651.
Japanese Office Action issued Dec. 18, 2012 in corresponding Japanese Patent Application No. 2008-250258 with partial English translation.
Supplementary European Search Report issued Feb. 14, 2012 in corresponding European Patent Application No. 09815956.9.
Decision to Grant a European Patent issued Aug. 7, 2014 in corresponding European Patent Application No. 09815956.9.

* cited by examiner

METAL MEMBER MANUFACTURING METHOD, INDENTER AND METAL MEMBER MANUFACTURING APPARATUS

TECHNICAL FIELD

The present invention is related to a metal member manufacturing method which gives metal material a residual stress to improve a fatigue life, and an indenter and a metal member manufacturing apparatus used for the method.

BACKGROUND ART

A metal member with a hole is used for various structures. The metal member having high fatigue strength is needed especially for an aircraft.

JP H07-500,773A, U.S. Pat. No. 6,389,865, U.S. Pat. No. 6,742,376 and U.S. Pat. No. 7,131,310 disclose a method of improving the fatigue life of a metal plate member with a hole. This method will be described with reference to FIGS. 1 to 3.

Referring to FIG. 1, a work piece 290 of a plate shape is provided with a front surface 291 and a back surface 292 on a side opposite to the front surface. In a condition that a metal block 299 is placed against the back surface 292, an indenter set 200 is pressed against the work piece 290 from the side of front surface 291. The indenter set 200 is pushed against a hole formation region of the work piece 290 for the hole to be formed.

Referring to FIG. 2, a dimple 293 is formed in the hole formation region of the work piece 290 by the previous pressing. Then, a through-hole is opened in the hole formation region by using a drill 300.

FIG. 3 shows the work piece 290 before opening the through-hole. A plastic deformation region 294 is formed around the dimple 293. A curve 296 shows a residual stress distribution in the work piece 290 generated after opening the hole. The curve 296 shows the residual stress distribution along a line L200 passing through the center of the dimple 293.

Because a compression residual stress is given around the through-hole by opening the through-hole in the dimple 293 of the hole formation region with a drill 300, the fatigue life of the work piece 290 is improved.

CITATION LIST

Patent Literatures

[Patent Literature 1]: JP H07-500,773A
[Patent Literature 2]: U.S. Pat. No. 6,389,865
[Patent Literature 3]: U.S. Pat. No. 6,742,376
[Patent Literature 4]: U.S. Pat. No. 7,131,310

SUMMARY OF THE INVENTION

The present invention is to provide a metal member manufacturing method, an indenter and a metal member manufacturing apparatus, which are suitable to give a residual stress around a hole with a relatively low press load even when the size of the hole is large. In a conventional method, a large-sized press machine is required for the large hole because the press load becomes large in proportional to the area of the hole, and therefore the hole size is limited.

According to a first aspect of the present invention, the metal member manufacturing method is achieved by pressing a second portion of a metal material without pressing a first portion of the metal material, and pressing the first portion without pressing the second portion. The metal material has the hole formation region in which one through-hole is to be opened. The first portion and the second portion are contained in the hole formation region.

It is desirable that the hole formation region has a shape of a circle. The second portion is apart from the first portion in a circumferential direction of the circle.

It is desirable that the hole formation region contains a third portion apart from the first portion and the second portion in a radial direction of the circle. It is desirable that the metal member manufacturing method according to the first aspect of the present invention is attained by further including pressing the third portion without pressing the first portion and the second portion.

It is desirable that the metal member manufacturing method according to the first aspect of the present invention is achieved by further including opening the through-hole in the hole formation region.

An indenter according to the second aspect of the present invention has a press surface of a shape obtained by dividing a circle into a circumferential direction.

It is desirable that the shape is surrounded by a first radius of the circle, a second radius of the circle, an arc of the circle between the first radius and the second radius, and an arc of a small circle which is concentric with the circle and which is between the first radius and the second radius.

The metal member manufacturing apparatus according to the third aspect of the present invention includes a first turntable configured to rotate around a first rotation axis parallel to a first direction as a press direction; a first indenter attached to the first turntable; a first actuator configured to move the first indenter in the first direction to press the first indenter to the metal material; a first load cell configured to measure a load acting on the first indenter. The metal material has a hole formation region in which one through-hole is to be opened. The hole formation region contains a first portion and a second portion. The first indenter is provided with a first press surface which is off-centered from the first rotation axis. The first actuator presses the first press surface against the first portion when the first turntable is in a first rotation position, and presses the first press surface against the second portion when the first turntable is in a second rotation position different from the first rotation position.

Preferably, the metal member manufacturing apparatus according to the third aspect of the present invention further includes a second turntable configured to rotate around a second rotation axis parallel to the first direction; a second indenter attached to the second turntable movable in the first direction; a second actuator configured to move the second indenter in the first direction to press the second indenter against the metal material; and a second load cell configured to measure a load acting on the second indenter. The first turntable is attached to the second turntable to be rotatable around the first rotation axis. The first rotation axis is arranged on the circumference of a circle having the second rotation axis as a center. The second indenter is provided with a circular second press surface. A central axis of the second press surface which is parallel to the first direction is arranged on the circumference.

It is desirable that the metal member manufacturing apparatus according to the third aspect of the present invention further includes a drill attached to the second turntable. A rotation axis of the drill is positioned on the circumference to be parallel to the first direction.

It is desirable that the metal member manufacturing apparatus according to the third aspect of the present invention further includes a reamer attached to the second turntable. A rotation axis of the reamer is arranged on the above circumference to be parallel to the first direction.

It is desirable that the metal member manufacturing apparatus according to the third aspect of the present invention further includes a guide extending into a second direction perpendicular to the first direction; a beam extending in a third direction perpendicular to the first direction and the second direction; a base block attached to the beam movable along the beam; a first drive unit configured to move the beam along the guide; and a second drive unit configured to move the base block along the beam. The first turntable is attached to the base block to be rotatable around the first rotation axis.

It is desirable that the metal member manufacturing apparatus according to the third aspect of the present invention further includes a guide extending into a second direction perpendicular to the first direction; a beam extending in a third direction perpendicular to the first direction and the second direction; a base block attached to the beam movable along the beam; a first drive unit configured to move the beam along the guide; and a second drive unit configured to move the base block along the beam. The second turntable is attached to the base block to be rotatable around the second rotation axis.

It is desirable that the metal member manufacturing apparatus according to the third aspect of the present invention further includes a carrying unit. The carrying unit is provided with a first roller configured to carry the metal material into the second direction perpendicular to the first direction; and a second roller configured to carry the metal material into the third direction perpendicular to the first direction and the second direction.

The metal member manufacturing apparatus according to a fourth aspect of the present invention includes a turntable configured to rotate around a first rotation axis parallel to a first direction; a first indenter attached to the turntable movable into the first direction; a first actuator configured to move the first indenter into the first direction to press the first indenter against the metal material; a first load cell configured to measure a load acting on the first indenter; a second indenter attached to the turntable movable into the first direction; a second actuator configured to move the second indenter into the first direction to press the second indenter against the metal material; and a second load cell configured to measure a load acting on the second indenter. The first indenter is provided with a first press surface which is circular. The second indenter is provided with a second press surface having a shape surrounded by a first circumference of a first circle and a second circumference of a second circle which is concentric with the first circle and which is larger than the first circle. The central axis of the first press surface parallel to the first direction is arranged on a circumference having the first rotation axis as a center. The central axis of second press surface parallel to the first direction is arranged on the circumference. The metal material has a hole formation region in which one through-hole is to be opened. The hole formation region contains a first portion and a second portion around the first portion. The first actuator presses the first press surface against the first portion when the turntable is in the first rotation position. The second actuator presses the second press surface against the second portion when the turntable is in the second rotation position which is different from the first rotation position.

It is desirable that the metal member manufacturing apparatus according to the fourth aspect of the present invention further includes a carrying unit. The carrying unit is provided with a first roller configured to carry the metal material into a second direction which is perpendicular to the first direction, and a second roller configured to carry the metal material into a third direction which is perpendicular to the first direction and the second direction.

The metal member manufacturing apparatus according to the fifth aspect of the present invention includes an indenter set containing a first indenter and a second indenter; an indenter holder configured to hold the indenter set such that the first indenter and the second indenter are movable into the first direction independently; loading block; an actuator configured to move the loading block into the first direction; and a shim exchange unit. The indenter set is arranged between the loading block and the metal material. The metal material has a hole formation region in which one through-hole is to be opened. The hole formation region contains a first portion and a second portion. When the shim exchange unit arranges a first shim between the loading block and the indenter set, the actuator moves the loading block toward the metal material, and the first shim comes in contact with the loading block and presses the first indenter against the first portion. When the shim exchange unit arranges a second shim between the loading block and the indenter set, the actuator moves the loading block toward the metal material, and the second shim comes in contact with the loading block and presses the second indenter against the second portion.

The first indenter is provided with a first press surface which is pressed against the first portion. The second indenter is provided with a second press surface which is pressed against the second portion. It is desirable that each of the first press surface and the second press surface has a shape obtained by dividing a circle into a circumferential direction.

It is desirable that the hole formation region contains a third portion. It is desirable that the indenter set contains a third indenter. The indenter holder bundles up the indenter set such that the first indenter, the second indenter and the third indenter are movable into the first direction independently. The first indenter and the second indenter are arranged around the third indenter. When the shim exchange unit arranges a third shim between the loading block and the indenter set, the actuator moves the loading block toward the metal material, and the third shim comes in contact with the loading block to press the third indenter against the third portion. The third indenter is provided with a third press surface which is pressed against the third portion. The third press surface is circular.

It is desirable that the metal member manufacturing apparatus according to the fifth aspect of the present invention further includes a carrying unit. The carrying unit includes a first roller configured to carry the metal material into the second direction which is perpendicular to the first direction, and a second roller configured to carry the metal material into the third direction which is perpendicular to the first direction and the second direction.

According to the present invention, a metal member manufacturing method, an indenter and a metal member manufacturing apparatus are provided which are suited to give the residual stress around the hole with the relatively low press load even when the hole size is large.

BRIEF DESCRIPTION OF THE DRAWINGS

The above objects, the other objects, the advantageous effect and the features of the present invention are made apparent in conjunction with the description of embodiments with reference to the following drawings.

DESCRIPTION OF EMBODIMENTS

Hereinafter, a metal member manufacturing method, an indenter and a metal member manufacturing apparatus according to the present invention will be described in detail with reference to the attached drawings.

First Embodiment

Figure 1:
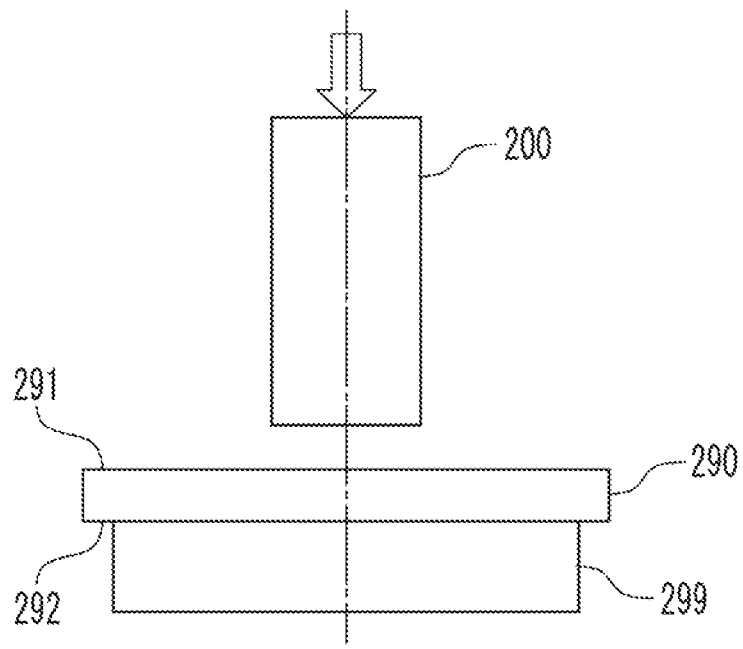
FIG. 1 shows a conventional residual stress giving process.
Figure 2:
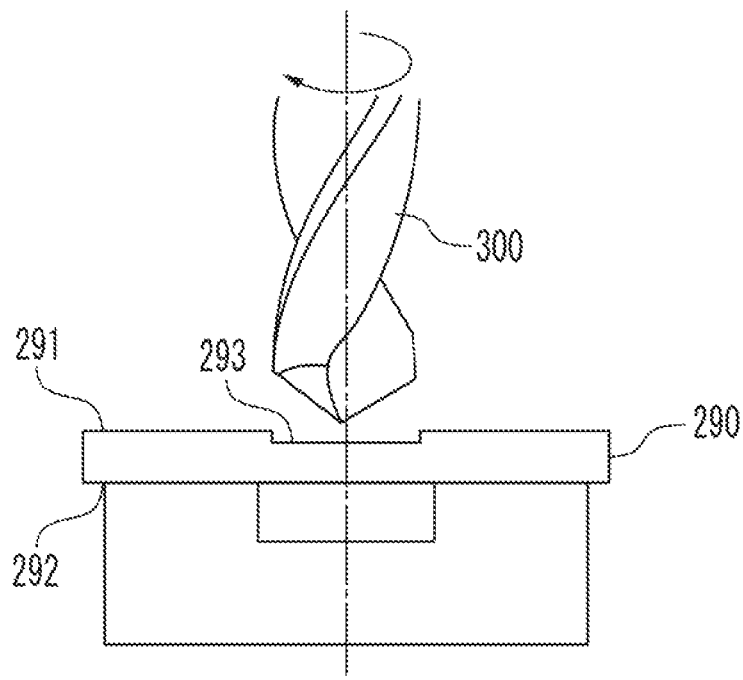
FIG. 2 shows a conventional hole drilling process.
Figure 3:
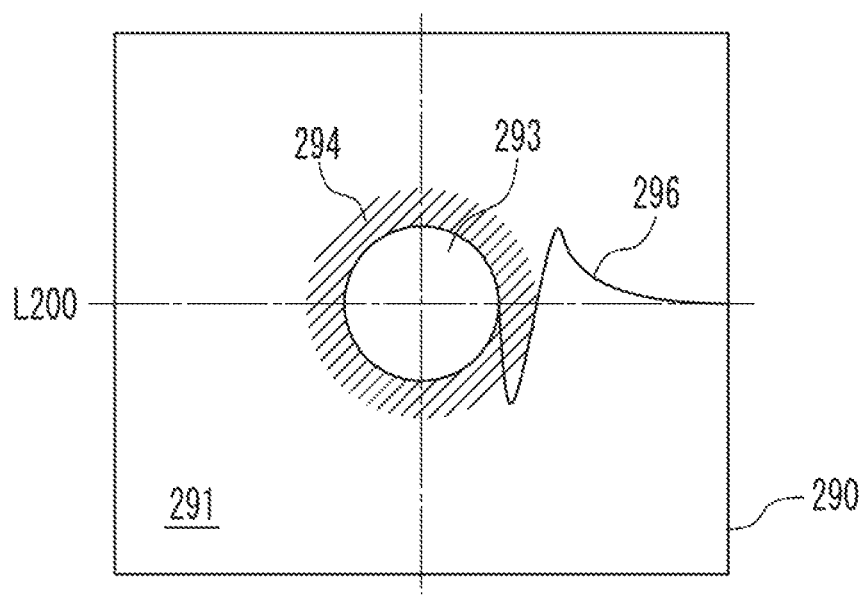
FIG. 3 is a plan view of a work piece on which a dimple is formed by the conventional residual stress giving process.
Figure 4:
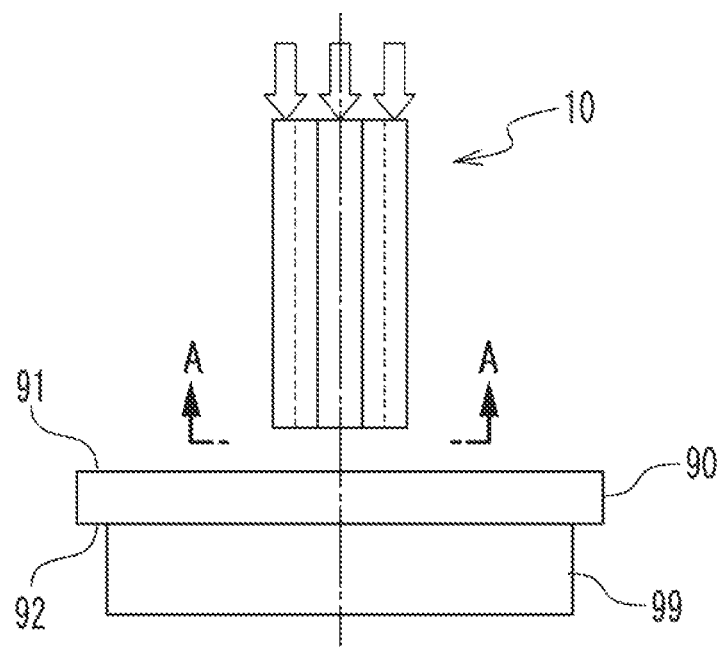
FIG. 4 shows a residual stress giving process using an indenter according to a first embodiment of the present invention.

FIG. 4 shows a process of giving a residual stress to a work piece 90 by a cold work using an indenter set 10 according to a first embodiment of the present invention. The work piece 90 is a metal material of a plate shape which has a front surface 91 and a back surface 92. In a condition that a metal block 99 is placed against the back surface 92, the indenter set 10 is pressed against to the front surface 91 of the work piece 90. The work piece 90 has a hole formation region in which one through-hole is to be opened. The through-hole and the hole formation region are circular.

Figure 5:
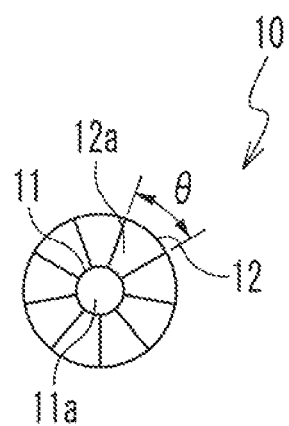
FIG. 5 is a view of an indenter in the first embodiment when viewed from an A direction in FIG. 4.

As shown in FIG. 5, the indenter set 10 contains an indenter 11 and a plurality of indenters 12. The indenter 11 is provided with a circular press surface 11a and the indenters 12 are provided with press surfaces 12a obtained by dividing a circle (large circle) along a circumferential direction. The press surface 12a has a shape surrounded by first and second radii of the large circle, an arc of the large circle between the first radius and the second radius, and an arc of a small circle between the first radius and the second radius. The large circle and the small circle are concentric. The radius of the small circle is equal to the radius of the press surface 11a. For example, when an angle θ between the first radius and the second radius is 40°, the number of indenters 12 is 9. When the indenter 11 and the indenters 12 are bundled as shown in FIG. 5, the press surface 11a and the press surfaces 12a form the large circle. The diameter of the large circle and the diameter of the hole formation region are approximately equal to the diameter of the through-hole. Accurately, it is desirable that the diameter of the large circle and the diameter of the hole formation region are slightly smaller than that of the through-hole.

Figure 6:
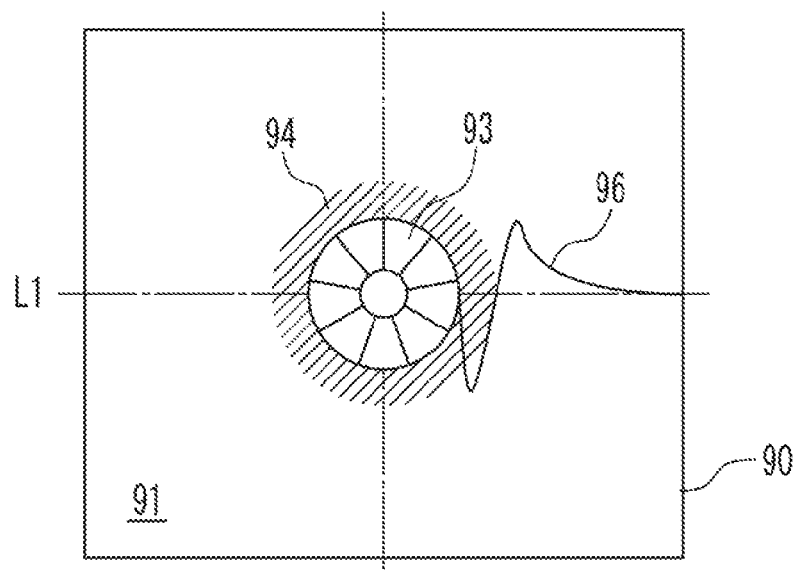
FIG. 6 is a plan view of a work piece on which a dimple is formed by the indenter in the first embodiment.

As shown in FIG. 6, by pressing the indenter set 10 to the hole formation region, a dimple 93 is formed in the hole formation region, and a plastic deformation region 94 is formed around the dimple 93. Supposing that the angle θ between the first radius and the second radius is 40°, the hole formation region (the dimple 93 to be formed there) contains ten portions. The second to tenth portions are arranged in constant intervals around the first portion as a center circular portion. The second to tenth portions are shifted outwardly from the first portion into the radial direction of the circle of the hole formation region. The second to tenth portions are arranged in positions different from each other along the circumferential direction of the circle of the hole formation region. The press surface 11a is first pressed against the first portion. Next, the press surface 12a of the first indenter 12 is pressed against the second portion. In the same way, the press surfaces 12a of the second to ninth indenters 12 are pressed against the third to tenth portions in the hole formation region, respectively.

When the pressing against the whole hole formation region is completed, a through-hole is opened in the hole formation region (dimple 93). A residual stress distribution 96 shows an induced residual stress distribution in the work piece 90 after the through-hole is opened, and shows the distribution along a linear line L1 which passes through the center of the dimple 93. Because a compression residual stress is given around the through-hole, the fatigue life of the work piece 90 is improved.

In the present embodiment, the residual stress is given to the work piece 90 by pressing a plurality of portions against the hole formation region one after another. That is, when one portion is pressed, the remaining portions are not pressed. Therefore, the load necessary to press each of the portions against the hole formation region is smaller than the load necessary to press against the whole hole formation region at a time. For example, when the area of the press surface 11a and the area of each of the press surfaces 12a are equal to each other, the load necessary to press the press surface 11a or press surface 12a against the work piece 90 can be reduced to 1/10 of the load necessary to press against the whole hole formation region at a time.

Therefore, the indenter set 10 and the metal member manufacturing method according to the present embodiment can give the residual stress around the through-hole with the relatively low load even when the through-hole is large in size. Therefore, even when the through-hole has so large in size that a conventional method cannot be used because a large press machine is necessary, the fatigue life of the present metal member manufactured from the work piece 90 is improved.

Figure 7:
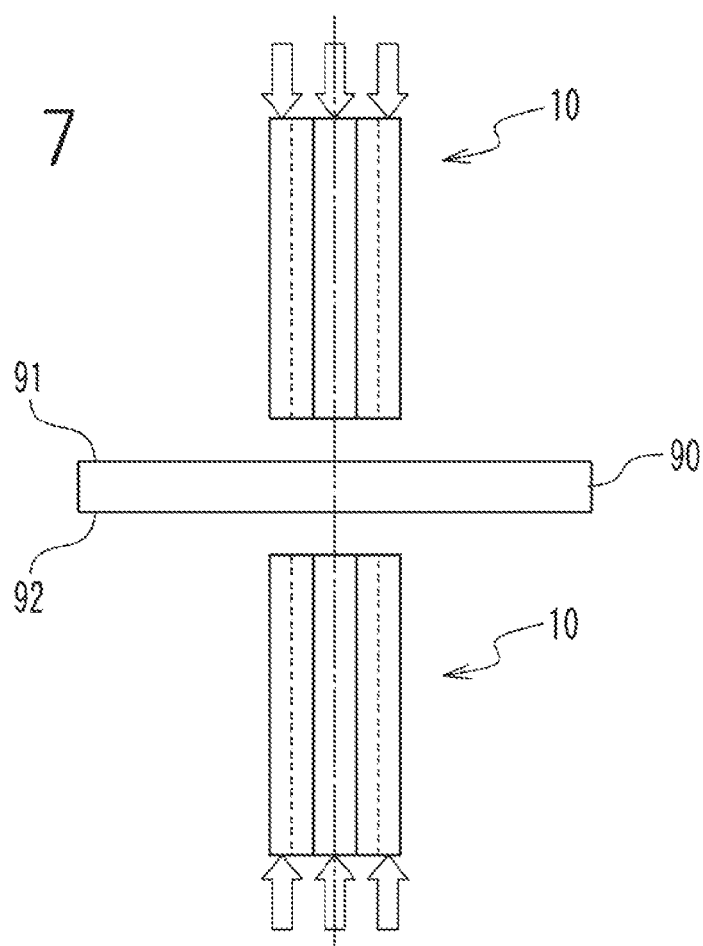
FIG. 7 shows another residual stress giving process using the indenter in the first embodiment.

FIG. 7 shows another residual stress giving process using the indenter set 10. Here, instead of pushing the metal block 99 to the back surface 92, the work piece 90 is pressed from the side of back surface 92 by another indenter set 10. It is possible to generate a less warp in the work piece 90 by pressing the work piece 90 symmetrically from the side of the front surface 91 and the side of the back surface 92.

Second Embodiment

Figure 8:
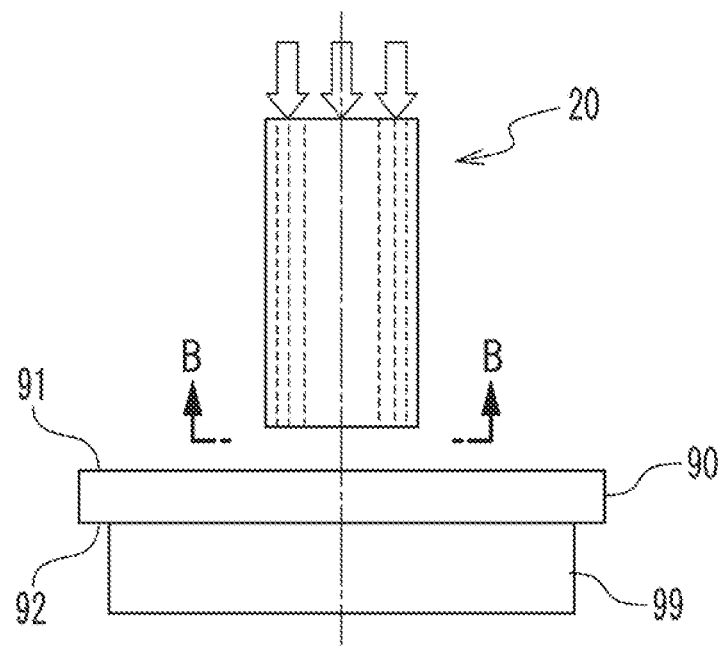
FIG. 8 shows the residual stress giving process using the indenter according to a second embodiment of the present invention.

FIG. 8 shows a process of giving the residual stress to the work piece 90 by using an indenter set 20 according to a second embodiment of the present invention. The work piece 90 has the hole formation region in which one through-hole is to be opened. The through-hole and the hole formation region are circular. In a condition that the metal block 99 is pushed against the back surface 92 of the work piece 90, the indenter set 20 is pressed against the work piece 90 from the side of the front surface 91.

Figure 9:
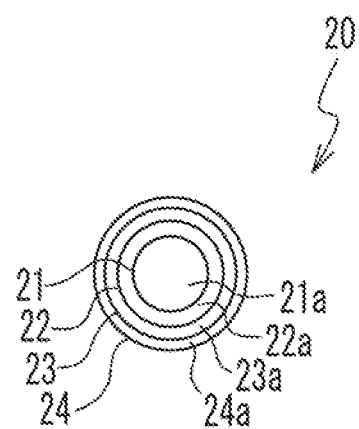
FIG. 9 is a view showing the indenter in the second embodiment when viewed from a B direction in FIG. 8.

As shown in FIG. 9, the indenter set 20 contains indenters 21 to 24. The indenter 21 is provided with a circular press surface 21a. The indenter 22 is provided with a press surface 22a surrounded by a circumference of a first circle and a circumference of a second circle which is larger than the first circle and is concentric with the first circle. The radius of the first circle is equal to the radius of the press surface 21a. The indenter 23 is provided with a press surface 23a surrounded by the circumference of the second circle and the circumference of a third circle which is larger than the second circle and is concentric with the second circle. The indenter 24 is provided with a press surface 24a surrounded by the circumference of the third circle and the circumference of a fourth circle which is larger than the third circle and is concentric with the third circle. As shown in FIG. 9, the indenter 22 is arranged outside the indenter 21 and the indenter 23 is arranged outside the indenter 22, and the indenter 24 is arranged outside the indenter 23. In this case, the press surfaces 21a to 24a form the fourth circle. The diameter of the fourth circle and the diameter of the hole formation region are approximately equal to the diameter of the through-hole to be formed later.

The hole formation region has a first region, a second region outside the first region, a third region outside the second region and a fourth region outside the third region. The first to fourth regions are arranged to be concentric. The press surface 21a is pushed to the first region and pressed against the first region. Next, the press surface 22a is pushed to the second region and pressed against the second region. Next, the press surface 23a is pushed to the third region and pressed against the third region. Next, the press surface 24a is pushed to the fourth region and pressed against the fourth region.

As such, like the first embodiment, a dimple is formed in the front surface 91. After that, a through-hole is formed in the hole formation region (dimple) and a residual stress is given around the hole.

In the present embodiment, it is desirable that the areas of the press surfaces 21a to 24a are equal to each other because a press load can be the same. When the number of indenters of the indenter set 20 is increased, the width of the press surface of the outermost indenter (e.g. the indenter 24) becomes narrower and the strength of the indenter reduces. Therefore, it is difficult to increase the number of divisions in this method. In case of the indenter set 10, such a reduction of the strength is prevented.

Instead of pushing a metal block 99 to the back surface 92 of the work piece 90, the back surface 92 is pressed by another indenter set 20. Because the work piece 90 is pressed symmetrically from a side of the front surface 91 and a side of the back surface 92, a warp is reduced in the work piece 90.

Third Embodiment

Figure 10:
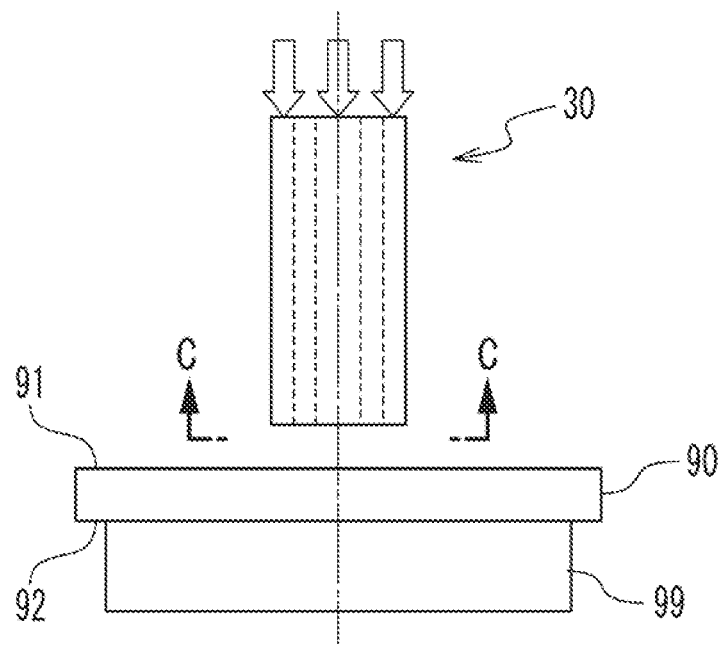
FIG. 10 shows the residual stress giving process using the indenter according to a third embodiment of the present invention.

FIG. 10 shows a process of giving a residual stress to the work piece 90 by using the indenter set 30 according to a third embodiment of the present invention. The work piece 90 has the hole formation region in which one through-hole is to be opened. The through-hole and the hole formation region are circular. In a condition that the metal block 99 is pushed to the back surface 92, the indenter set 30 is pressed against the work piece 90 from a side of the front surface 91.

Figure 11:
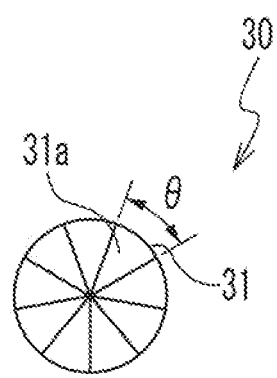
FIG. 11 is a view showing the indenter in the third embodiment when viewed from a C direction in FIG. 10.

As shown in FIG. 11, an indenter set 30 contains a plurality of indenters 31. The indenters 31 are provided with press surfaces 31a by dividing a circle along a circumferential direction. The press surfaces 31a are sectors. For example, when the angle θ at a fan-shaped vertex is 40°, the number of indenters 31 is 9. When the plurality of indenters 31 are bundled as shown in FIG. 11, the plurality of press surfaces 31a form one circle. The diameter of this circle and the diameter of the hole formation region are approximately equal to the diameter of the through-hole.

The hole formation region contains nine regions. The first to ninth regions are arranged in constant intervals along the circumference, and are shifted to different positions in a circumferential direction of the circle of the hole formation region. The first indenter 31 is pushed to the first region and pressed against the first region. In the same way, the second to ninth indenters 31 are pressed to the second to ninth regions one after another.

As described above, the dimple is formed in the front surface 91 like the first embodiment. After that, a through-hole is formed in the hole formation region (the dimple) and the residual stress is given around the hole.

When the angle θ is made small to increase the number of indenters of the indenter set 30 in the present embodiment, the strength at the vertex portion of the indenter reduces. Also, the dimple surface formed with the vertexes becomes ambiguous. On the contrary, in case of the indenter set 10, such strength reduction is prevented and the dimple surface can be formed successfully.

Instead of pushing the metal block 99 to the back surface 92 of the work piece 90, another indenter set 30 is pressed against the back surface 92 from a side of the back surface 92. The generation of warp in the work piece 90 can be prevented by pressing the work piece 90 symmetrically from the side of the front surface 91 and the side of the back surface 92.

Fourth Embodiment

Figure 12:
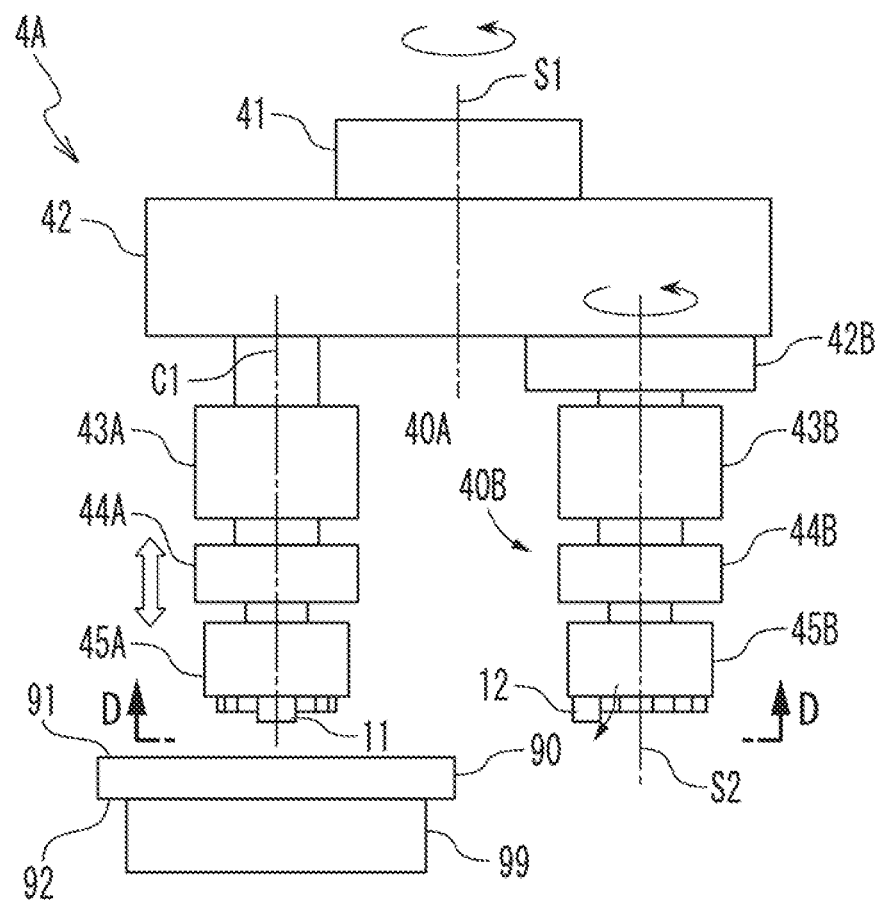
FIG. 12 is a side view of a metal member manufacturing apparatus according to a fourth embodiment of the present invention.

FIG. 12 shows a unit 4A of the metal member manufacturing apparatus according to a fourth embodiment of the present invention. The unit 4A gives a residual stress to the work piece 90. In a condition that the metal block 99 is pushed to the back surface 92, the unit 4A presses against the work piece 90 from the side of the front surface 91.

The unit 4A is provided with a base rod 41, a turntable 42, and sub-units 40A and 40B attached to the turntable 42. The turntable 42 is attached to the base rod 41 to be rotatable around a rotation axis S1 parallel to the first direction. The first direction is perpendicular to the front surface 91. The sub-unit 40A is provided with an actuator 43A, a load cell 44A, an indenter holder 45A and an indenter 11. The indenter holder 45A is attached to the load cell 44A. The load cell 44A is attached to the turntable 42 through the actuator 43A. The indenter holder 45A bundles up the indenter 11. The actuator 43A moves the indenter holder 45A into a direction parallel to the first direction. The load cell 44A measures a load acting on the indenter 11. The indenter 11 is provided with a circular press surface 11a as mentioned above. A central axis C1 passing through a center of the press surface 11a is parallel to the first direction. The indenter 11 moves along the central axis C1. The sub-unit 40B is provided with a turntable 42B, an actuator 43B, a load cell 44B, an indenter holder 45B, and an indenter 12. The turntable 42B is attached to the turntable 42 to be rotatable around the rotation axis S2 parallel to the first direction. The indenter holder 45B is attached to the load cell 44B. The load cell 44B is attached to the turntable 42B through the actuator 43B. The indenter holder 45B bundles up the indenter 12. The actuator 43B is fixed on the turntable 42B and moves the indenter holder 45B in the direction parallel to the first direction. The load cell 44B measures the load acting on the indenter 12.

Figure 13:
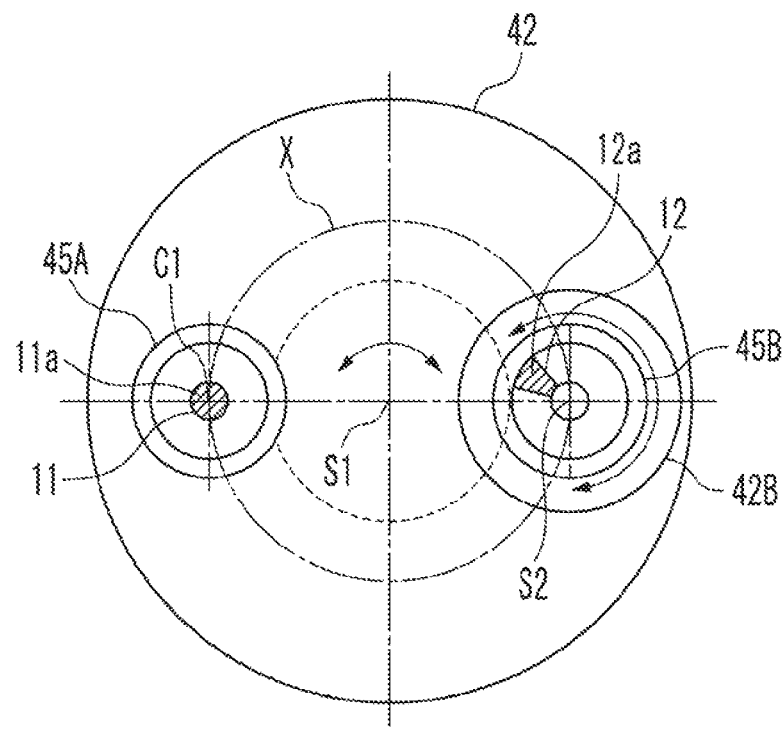
FIG. 13 is a view showing the metal member manufacturing apparatus in the fourth embodiment when viewed from a D direction in FIG. 12.

Referring to FIG. 13, the central axis C1 and the rotation axis S2 are arranged on the circumference X of a circle having the rotation axis S1 as a center. The indenter holder 45B bundles up the indenter 12 so that the press surface 12a is off-centered from the rotation axis S2. The rotation axis S2 does not pass through the press surface 12a.

A process of giving a residual stress to the work piece 90 by the unit 4A will be described with reference to FIGS. 12 and 13.

The work piece 90 is a metal material of a plate shape which has the front surface 91 and the back surface 92. The work piece 90 has the hole formation region in which one through-hole is to be opened. The through-hole and the hole formation region are circular. The hole formation region contains a central region and a plurality of peripheral regions. The plurality of peripheral regions are arranged in constant intervals in a region around the central region. Each of the plurality of peripheral regions is positioned outside a central region in a radial direction of the circle of the hole formation region. The plurality of peripheral portions are arranged in different positions from each other in a circumferential direction of the circle in the hole formation region. The turntable 42 takes a first rotation position related to the rotation axis S1 when the central axis C1 passes through the central region and a second rotation position related to the rotation axis S1 that the rotation axis S2 passes through the central region. When the turntable 42 is in the first rotation position related to the rotation axis S1, the actuator 43A pushes the press surface 11a to the central region and presses against the central region. Next, the turntable 42 is rotated with respect to the base rod 41 and takes a second rotation position related to the rotation axis S1. When the turntable 42B takes the first rotation position related to the rotation axis S2, the actuator 43B pushes the press surface 12a to one of the plurality of peripheral regions and presses against the peripheral region. Next, the turntable 42B rotates with respect to the turntable 42 and takes the second rotation position related to the rotation axis S2. The actuator 43B pushes the press surface 12a to a next one of the plurality of peripheral regions and presses against the next peripheral region. In this way, the plurality of peripheral regions are pressed one after another.

Here, the peripheral regions adjacent to each other and contained in the plurality of peripheral regions may have an overlapping portion or may not have any overlapping portion.

Figure 14:
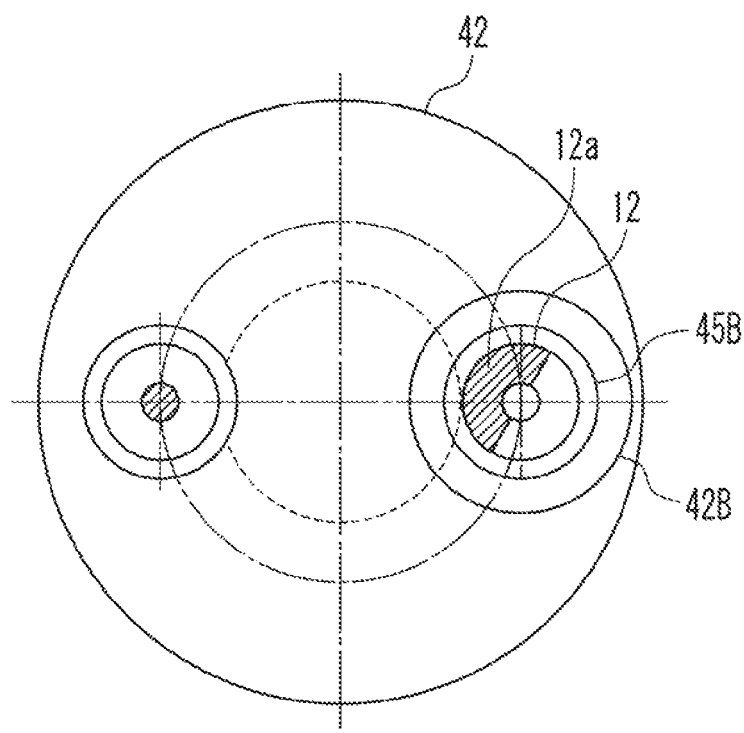
FIG. 14 is a view showing another metal member manufacturing apparatus in the fourth embodiment when viewed from the D direction in FIG. 12.

FIG. 14 shows a case that the angle θ of the press surface 12a is 180°. When the number of peripheral regions is 2, the peripheral regions have no overlapping portion. When the number of peripheral regions is equal to or more than 3, the peripheral regions contained in the plurality of peripheral regions and adjacent to each other have an overlapping portion.

By pressing against the work piece 90 symmetrically from the side of the front surface 91 and the side of the back surface 92 by using the two units 4A, a residual stress may be given to the work piece 90.

The indenter 12 may be replaced with the indenter 31. In this case, the sub-unit 40A and the turntable 42 are removed and the turntable 42B is directly attached to the base rod 41.

Fifth Embodiment

Figure 15:
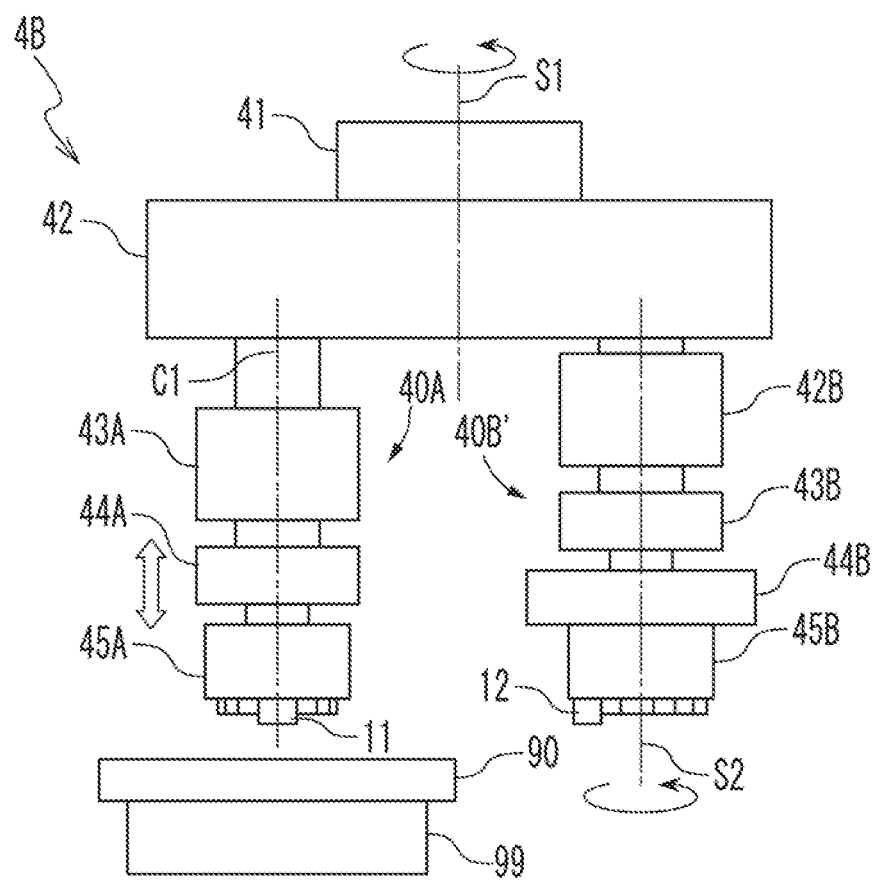
FIG. 15 is a side view of the metal member manufacturing apparatus according to a fifth embodiment of the present invention.

FIG. 15 shows a unit 4B which is included in the metal member manufacturing apparatus according to a fifth embodiment of the present invention. The unit 4B is configured in the same manner as the unit 4A except that the sub-unit 40B is replaced with a sub-unit 40B'. The sub-unit 40B' is provided with an actuator 43B, load cell 44B, the turntable 42B, the indenter holder 45B and the indenter 12. The actuator 43B is fixed on the turntable 42. The turntable 42B is attached to the load cell 44B to be movable in a direction parallel to the first direction and rotatable around the rotation axis S2. The load cell 44B is attached to the turntable 42 through the actuator 43B. The indenter holder 45B is fixed on the turntable 42B. The indenter holder 45B bundles up the indenter 12. The actuator 43B moves the turntable 42B in the parallel direction to the first direction.

A process of giving a residual stress to the work piece 90 by the unit 4B is the same as the process of giving the residual stress to the work piece 90 by the unit 4A.

Sixth Embodiment

Figure 16:
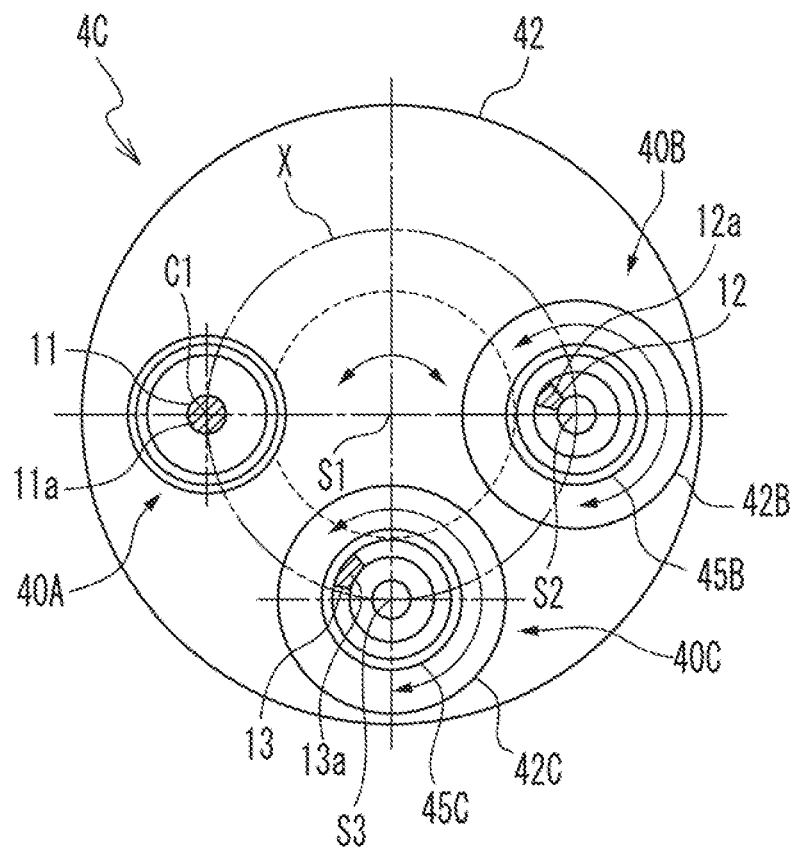
FIG. 16 is a view showing the metal member manufacturing apparatus according to a sixth embodiment of the present invention.

FIG. 16 shows a unit 4C which is included in the metal member manufacturing apparatus according to a sixth embodiment of the present invention. The unit 4C has a configuration obtained by adding a sub-unit 40C to the unit 4A. The sub-unit 40C is provided with the turntable 42C, an actuator, a load cell, an indenter holder 45C and an indenter 13. The turntable 42C is attached to the turntable 42 to be rotatable around the rotation axis S3 which is parallel to the first direction. The indenter holder 45C is attached to the turntable 42C to be movable in parallel to the first direction. The actuator is fixed on the turntable 42 and moves the indenter holder 45C in the direction parallel to the first direction. The load cell measures a load acting on the indenter 13. The rotation axis S3 is on the circumference X. The indenter holder 45C bundles up the indenter 13 so that the press surface 13a of the indenter 13 is off-centered from the rotation axis S3. The rotation axis S3 does not pass through the press surface 13a.

Figure 17:
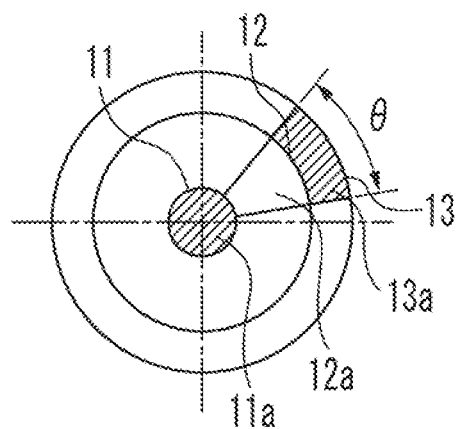
FIG. 17 is a view showing the shape of a press surface of the indenter used in the metal member manufacturing apparatus in the sixth embodiment.

Referring to FIG. 17, the press surfaces 11a, 12a and 13a will be described. The press surface 13a has a shape obtained by dividing a circle (a large circle) along a circumference. The press surface 13a has a shape surrounded by a first radius and second radius of the large circle, an arc of the large circle between the first radius and second radius of the large circle, and an arc of a middle circle between the first radius and the second radius. The middle circle is smaller than the large circle and is concentric with the large circle. The press surface 12a has a shape obtained by dividing a circle (middle circle) along a circumference. The press surface 12a has a shape surrounded by the first radius and the second radius, an arc of the middle circle between the first radius and the second radius, and an arc of a small circle between the first radius and the second radius. The small circle is smaller than the middle circle and is concentric with the large circle. The press surface 11a corresponds to the small circle and is circular. For example, when the number of divisions along the circumference is 9, the angle θ between the first radius and the second radius is 40° for the middle circle and large circle. The angle θ may be arbitrary.

A process of giving a residual stress to the work piece 90 by the unit 4C will be described below.

The work piece 90 is the metal material of the plate shape which has the front surface 91 and the back surface 92. The work piece 90 has the hole formation region in which one through-hole is to be opened. The through-hole and the hole formation region are circular. The hole formation region contains a central region, a plurality of inner peripheral regions, and a plurality of outer peripheral regions. The plurality of inner peripheral regions are arranged in constant intervals in a peripheral region outside the central region, and are arranged in different positions from each other along a circumference of the circle of the hole formation region. The plurality of outer peripheral regions are arranged in the constant intervals along a circumference outside the plurality of peripheral regions, and are arranged in different position from each other along the circumference of the circle of the hole formation region. The unit 4C presses against the central region and the plurality of inner peripheral regions, like the unit 4A. After pressing against the regions, the turntable 42 rotates to the base rod 41 and takes a third rotation position related to the rotation axis S1. At this time, the rotation axis S3 passes the central region. When the turntable 42C takes a first rotation position related to the rotation axis S3, the actuator pushes the press surface 13a to one of the plurality of outer peripheral regions and presses it against the outer peripheral region. Next, the turntable 42C rotates to the turntable 42 and takes a second rotation position related to the rotation axis S3. The actuator pushes the press surface 13a to a next outer peripheral region and presses it against the next outer peripheral region. In this way, the plurality of outer peripheral regions are pressed one after another.

The adjacent ones of the plurality of outer peripheral regions may have an overlapping region and may have no overlapping region.

By pressing against the work piece 90 symmetrically from the side of the front surface 91 and the side of the back surface 92, the two units 4C may give residual stresses to the work piece 90.

Seventh Embodiment

Figure 18:
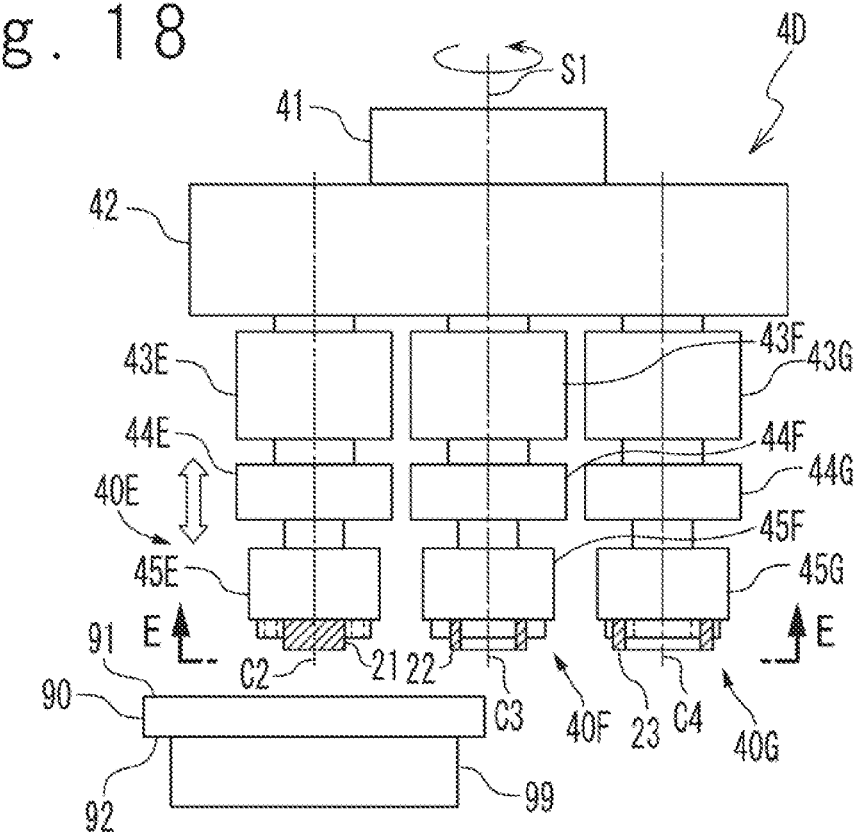
FIG. 18 is a side view of the metal member manufacturing apparatus according to a seventh embodiment of the present invention.
Figure 19:
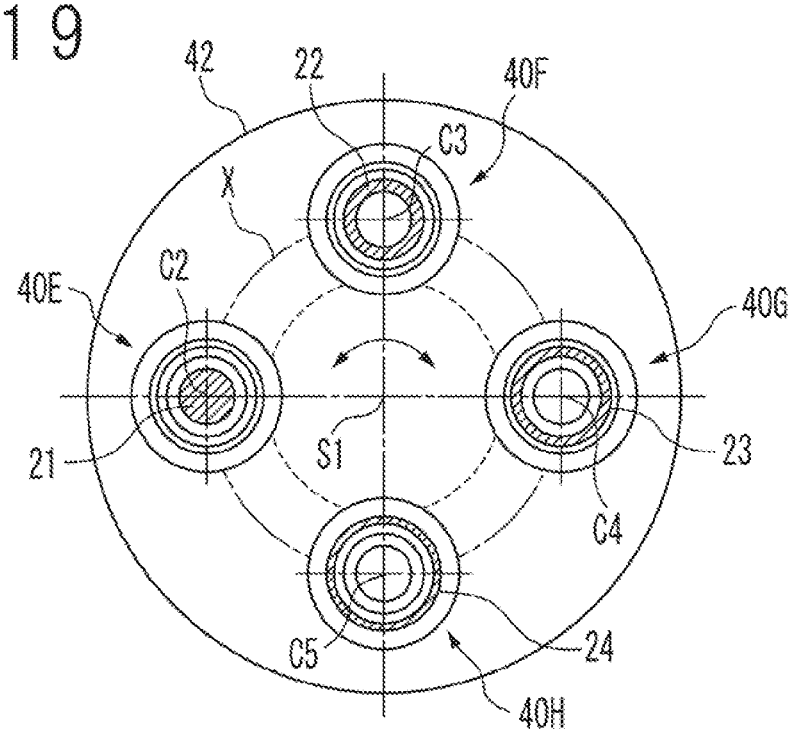
FIG. 19 is a view showing the metal member manufacturing apparatus in the seventh embodiment when viewed from an E direction in FIG. 18.

A unit 4D contained in the metal member manufacturing apparatus according to a seventh embodiment of the present invention will be described with reference to FIG. 18 and FIG. 19. The unit 4D gives a residual stress to the work piece 90. In a condition that the metal block 99 is pushed to the back surface 92, the unit 4D presses against the work piece 90 from the side of the front surface 91. The unit 4D is provided with the base rod 41, the turntable 42 and the sub-units 40E to 40H attached to the turntable 42. The turntable 42 is attached to the base rod 41 to be rotatable around the rotation axis S1 which is parallel to the first direction.

The sub-unit 40E is provided with an actuator 43E, a load cell 44E, an indenter holder 45E and an indenter 21. The indenter holder 45E is attached to the load cell 44E. The load cell 44E is attached to the turntable 42 through the actuator 43E. The indenter holder 45E bundles up the indenter 21. The actuator 43E moves the indenter holder 45E in a direction parallel to the first direction. The load cell 44E measures a load acting on the indenter 21. The indenter 21 is provided with a circular press surface 21a as mentioned above. The central axis C2 of the press surface 21a which passes through a center of the press surface 21a is parallel to the first direction. The indenter 21 moves along the central axis C2. The central axis C2 is on the circumference X of a circle centering the rotation axis S1.

The sub-unit 40F is provided with an actuator 43F, a load cell 44F, an indenter holder 45F and an indenter 22. The indenter holder 45F is attached to the load cell 44F. The load cell 44F is attached to the turntable 42 through the actuator 43F. The indenter holder 45F bundles up the indenter 22. The actuator 43F moves the indenter holder 45F in a direction parallel to the first direction. The load cell 44F measures a load acting on the indenter 22. The indenter 22 is provided with a press surface 22a of the shape surrounded by the circumference of a first circle and the circumference of a second circle, as described above. The central axis C3 of the press surface 22a which passes through a center of the press surface 22a is parallel to the first direction. The indenter 22 moves along the central axis C3. The central axis C3 is arranged on the circumference X.

The sub-unit 40G is provided with an actuator 43G, a load cell 44G, an indenter holder 45G and an indenter 23. The indenter holder 45G is attached to the load cell 44G. The load cell 44G is attached to the turntable 42 through the actuator 43G. The indenter holder 45G bundles up the indenter 23. The actuator 43G moves the indenter holder 45G in a direction parallel to the first direction. The load cell 44G measures a load acting on the indenter 23. The indenter 23 is provided with a press surface 23a of the shape surrounded by the circumference of the second circle and the circumference of a third circle as described above. The central axis C4 of the press surface 23a which passes through a center of the press surface 23a is parallel to the first direction. The indenter 23 moves along the central axis C4. The central axis C4 is arranged on the circumference X.

The sub-unit 40H is provided with an actuator, a load cell, an indenter holder and an indenter 24. The indenter holder is attached to the load cell. The load cell is attached to the turntable 42 through the actuator. The indenter holder bundles up the indenter 24. The actuator moves the indenter holder in a direction parallel to the first direction. The load cell measures a load acting on the indenter 24. The indenter 24 is provided with the press surface 24a of a shape surrounded by the circumference of the third circle and the circumference of a fourth circle, as described above. The central axis C5 of the press surface 24a which passes through a center of the press surface 24a is parallel to the first direction. The indenter 24 moves along the central axis C5. The central axis C5 is arranged on the circumference X.

A process of giving a residual stress to the work piece 90 by the unit 4D will be described below.

The work piece 90 is the plate-like metal material which has the front surface 91 and the back surface 92. The work piece 90 has the hole formation region in which one through-hole is to be opened. The through-hole and the hole formation region are circular. The hole formation region is provided with a first region, a second region outside the first region, a third region outside the second region and a fourth region outside the third region. The first to fourth regions are arranged concentrically.

The turntable 42 takes a first rotation position at which the central axis C2 is related to the rotation axis S1 passing through the first region, a second rotation position at which the central axis C3 is related to the rotation axis S1 passing through the first region, a third rotation position at which the central axis C4 is related to the rotation axis S1 passing through the first region, and a fourth rotation position at which the central axis C5 is related to the rotation axis S1 passing through the first region. When the turntable 42 is in the first rotation position, the actuator 43E pushes the press surface 21a to the first region and presses against the first region. Next, the turntable 42 rotates to the base rod 41 and takes the second rotation position. When the turntable 42 is in the second rotation position, the actuator 43F pushes the press surface 22a to the second region and presses against the second region. Next, the turntable 42 rotates to the base rod 41 and takes the third rotation position. When the turntable 42 is in the third rotation position, the actuator 43G pushes the press surface 23a to the third region and presses against the third region. Next, the turntable 42 rotates to the base rod 41 and takes the fourth rotation position. When the turntable 42 is in the fourth rotation position, the actuator of the sub-unit 40H pushes the press surface 24a to the fourth region and presses against the fourth region.

The work piece 90 may be pressed symmetrically from the side of the front surface 91 and the side of the back surface 92 by the two units 4D to give a residual stress to the work piece 90.

Eighth Embodiment

Figure 20:
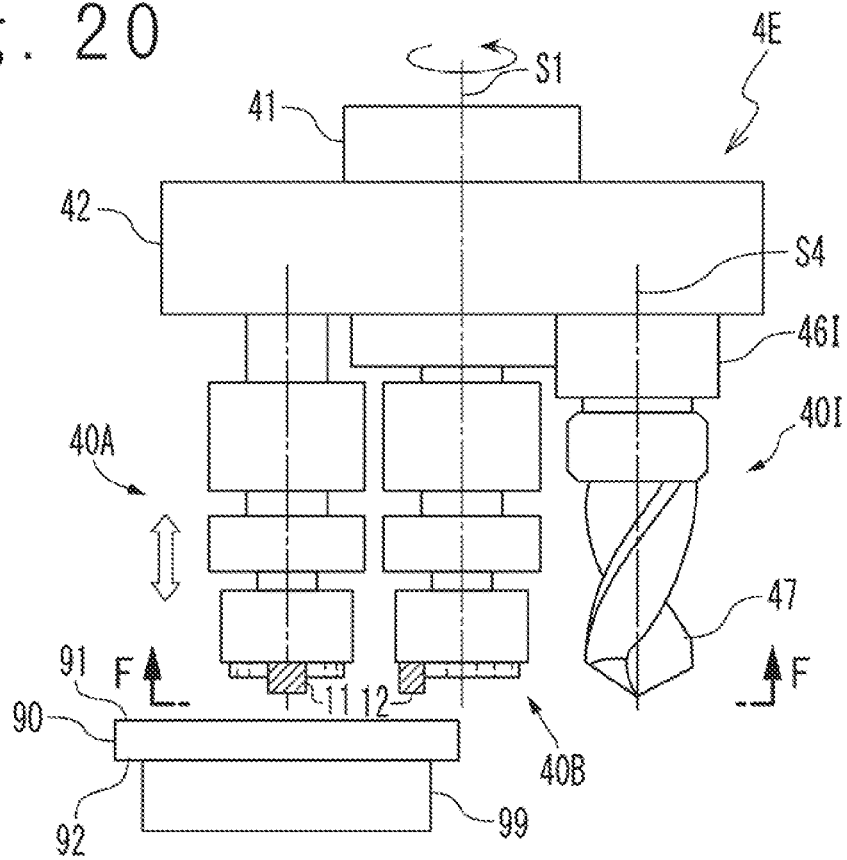
FIG. 20 is a side view of the metal member manufacturing apparatus according to an eighth embodiment of the present invention.
Figure 21:
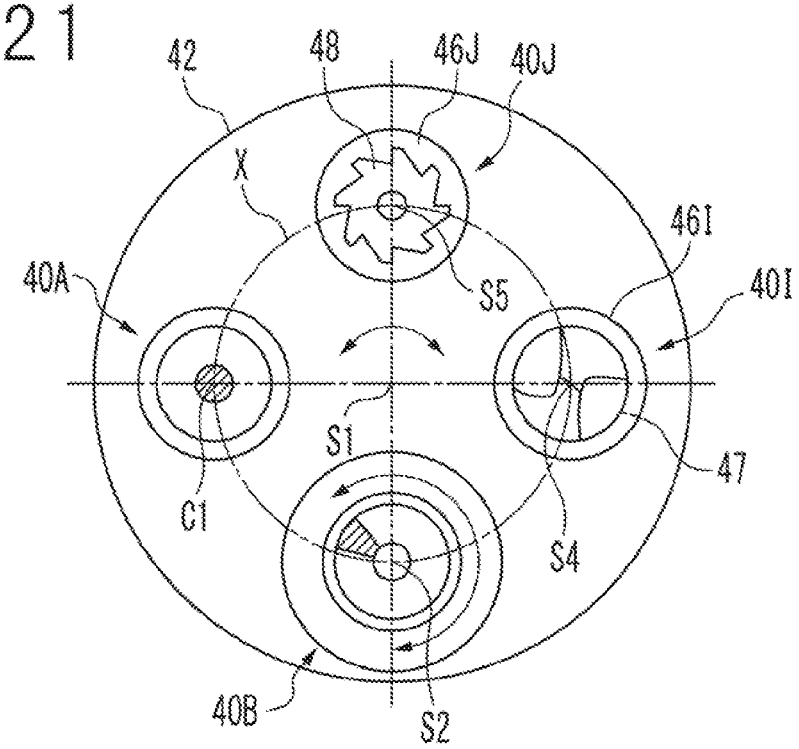
FIG. 21 is a view showing the metal member manufacturing apparatus in the eighth embodiment when viewed from an F direction in FIG. 20.

The unit 4E included in the metal member manufacturing apparatus according to an eighth embodiment of the present invention will be described with reference to FIG. 20 and FIG. 21. The unit 4E is attained by adding sub-units 40I and 40J to the unit 4A. In FIG. 20, the sub-unit 40J is omitted. The sub-unit 40I is attached to the turntable 42 which is rotatable around the rotation axis S1. The sub-unit 40I is provided with a drill 47 and a motor 46I which rotates the drill 47 around the rotation axis S4 parallel to the rotation axis S1. The rotation axis S4 is arranged on the circumference X. The sub-unit 40J is attached to the turntable 42 which is rotatable around the rotation axis S1. The sub-unit 40J is provided with a reamer 48 and a motor 46J which rotates the reamer 48 around the rotation axis S5 parallel to the rotation axis S1. The rotation axis S5 is arranged on the circumference X.

A process of giving a residual stress to the work piece 90 by the unit 4E and a process of opening a through-hole in the work piece 90 by the unit 4E will be described below.

The work piece 90 is the plate-like metal material which has the front surface 91 and the back surface 92. The work piece 90 has the hole formation region in which one through-hole is to be opened. The through-hole and the hole formation region are circular. The hole formation region contains a central region and a plurality of peripheral regions. The turntable 42 takes a first rotation position at which the central axis C1 is related to the rotation axis S1 passing through the central region, a second rotation position at which the rotation axis S2 is related to the rotation axis S1 passing through the central region, a third rotation position at which the rotation axis S4 is related to the rotation axis S1 passing through the central region, and a fourth rotation position at which the rotation axis S5 is related to the rotation axis S1 passing through the central region. The unit 4E presses against the hole formation region of the work piece 90 at the first and second rotation positions to give a residual stress to the work piece 90, like the unit 4A. Next, the turntable 42 rotates to the base rod 41 and takes the third rotation position related to the rotation axis S1. The drill 47 opens the through-hole in the hole formation region. Next, the turntable 42 rotates to the base rod 41 and takes the fourth rotation position related to the rotation axis S1. The reamer 48 grinds the inner surface of the drilled through-hole and finishes the through-hole.

It should be noted that the sub-units 40I and 40J may also be added to the units 4B to 4D.

Ninth Embodiment

Figure 22:
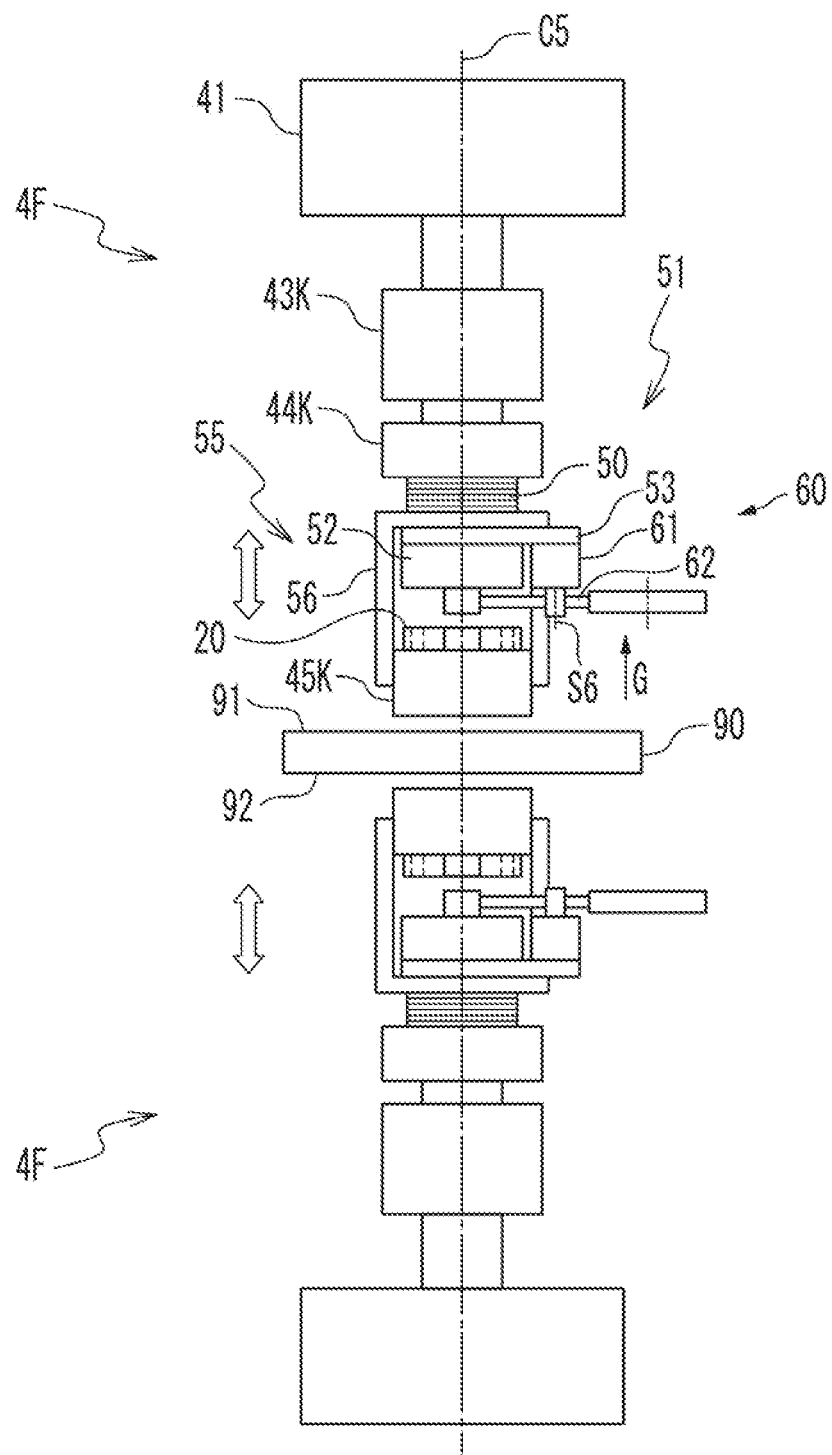
FIG. 22 is a side view of the metal member manufacturing apparatus according to a ninth embodiment of the present invention.

FIG. 22 shows a unit 4F included in the metal member manufacturing apparatus according to a ninth embodiment of the present invention. The unit 4F gives a residual stress to the work piece 90. The work piece 90 is pressed symmetrically from the side of the front surface 91 and the side of the back surface 92 by using the two units 4F.

The unit 4F is provided with a base rod 41, a first movable unit 51 attached to the base rod 41 to be movable into a first direction from the base rod 41, a second movable unit 55 attached to the first movable unit 51 to be movable into the first direction from the first movable unit 51, an actuator 43K which moves the first movable unit 51 into the first direction, and a spring 50 provided between the first movable unit 51 and the second movable unit 55. The first movable unit 51 is provided with a loading block 52, a load cell 44K which measures a load acting on the loading block 52, and a shim exchange unit 60 attached to the loading block 52 by the shim exchange supporting unit 53. The shim exchange unit 60 is provided with a shim assembly 62 attached to the shim exchange supporting unit 53 to be rotatable around the rotation axis S6 parallel to the first direction, and a motor 61 which rotates the shim assembly 62. The second movable unit 55 is provided with an indenter set 20, an indenter holder 45K which bundles up the indenter set 20, and a holder support 56 which fixes the indenter holder 45K. The indenter set 20 is arranged between the work piece 90 and the loading block 52. The spring 50 biases the second movable unit 55 to make the indenter set 20 close to the work piece 90 in order to facilitate shim exchange by providing a space between the indenter set 20 and the shim assembly 62 after removing press force. The indenter set 20 contains the indenters 21 to 24. The indenters 21 to 24 are movable in a direction parallel to the first direction independent from each other. The central axis C5 is parallel to the first direction and passes through the center of the loading block 52, a center of the press surface 21a of the indenter 21 and the work piece 90.

Figure 23:
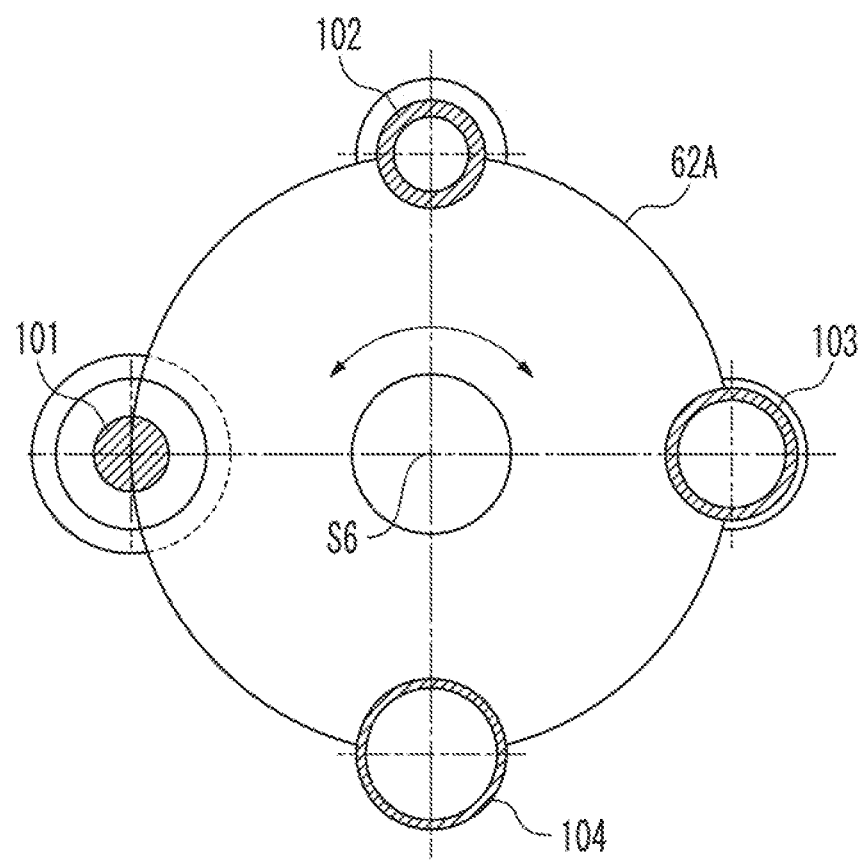
FIG. 23 is a view showing a shim assembly of the metal member manufacturing apparatus according to a ninth embodiment of the present invention when viewed from a G direction in FIG. 22.

A shim assembly 62A will be described with reference to FIG. 23. The shim assembly 62A is provided with shims 101 to 104. The shims 101 to 104 are convex sections corresponding to the press surfaces 21a to 24a, respectively. The shims 101 to 104 are arranged on the circumference of the circle centering the rotation axis S6. The shim assembly 62A rotates around the rotation axis S6 and takes to first to fourth rotation positions. When the shim assembly 62A takes the first rotation position, the shim 101 is arranged between the loading block 52 and the indenter set 20. When the shim assembly 62A takes the second rotation position, the shim 102 is arranged between the loading block 52 and the indenter set 20. When the shim assembly 62A takes the third rotation position, the shim 103 is arranged between the loading block 52 and the indenter set 20. When the shim assembly 62A takes the fourth rotation position, the shim 104 is arranged between the loading block 52 and the indenter set 20.

A process of giving a residual stress to the work piece 90 by the unit 4F will be described below.

The work piece 90 has the hole formation region in which one through-hole is to be opened. The hole formation region is provided with a first region which is circular, a second region outside the first region, a third region outside the second region and a fourth region outside the third region. The first to fourth regions are arranged concentrically. The central axis C5 passes through a center of the first region.

First, the shim assembly 62A takes the first rotation position. The actuator 43K moves the first movable unit 51 toward the work piece 90. Even after the second movable unit 55 hits the work piece 90, the first movable unit 51 moves toward the work piece 90. The shim 101 comes in contact with the loading block 52 and presses the indenter 21 against the first region. The press surface 21a is pressed against the first region. A press load is measured by the load cell 44K and a required load is given by the actuator 43K. After that, the actuator 43K moves the first movable unit 51 away from the work piece 90. At this time, the second movable unit 55 is returned to the original position with the force of the spring 50, so that a space is formed between the indenter 21 and the shim 101 such that the shim assembly 62A is easy to be rotated.

The shim assembly 62A rotates around the rotation axis S6 and takes the second rotation position. The actuator 43K moves the first movable unit 51 toward the work piece 90. Even after the second movable unit 55 hits the work piece 90, the first movable unit 51 moves toward the work piece 90. The shim 102 comes in contact with the loading block 52 and presses the indenter 22 against the second region. The press surface 22a is pressed against the second region. After that, when the actuator 43K moves the first movable unit 51 away from the work piece 90, the second movable unit 55 is returned to the original position with the force of the spring 50 so as to form a space between the indenter 22 and the shim 102.

The shim assembly 62A rotates around the rotation axis S6 and takes the third rotation position. The actuator 43K moves the first movable unit 51 toward the work piece 90. Even after the second movable unit 55 hits the work piece 90, the first movable unit 51 moves toward the work piece 90. The shim 103 comes in contact with the loading block 52 and presses the indenter 23 against the third region. The press surface 23a is pressed against the third region. After that, when the actuator 43K moves the first movable unit 51 away from the work piece 90, the second movable unit 55 is returned to the original position with the force of the spring 50 so as to form a space between the indenter 23 and the shim 103.

The shim assembly 62A rotates around the rotation axis S6 and takes the fourth rotation position. The actuator 43K moves the first movable unit 51 toward the work piece 90. Even after the second movable unit 55 hits the work piece 90, the first movable unit 51 moves toward the work piece 90. The shim 104 comes in contact with the loading block 52 and presses the indenter 24 against the fourth region. The press surface 24a is pressed against the fourth region. After that, when the actuator 43K moves the first movable unit 51 away from the work piece 90, the second movable unit 55 is returned to the original position with the force of the spring 50 so as to form a space between the indenter 24 and the shim 104.

A first modification example of the metal member manufacturing apparatus according to the present embodiment will be described below.

In the first modification example, the indenter set 20 is replaced with the indenter set 10, and the shim assembly 62A is replaced with a shim assembly 62B. The indenter set 10 is provided with the indenter 11 and the plurality of indenters 12. The central axis C5 passes through a center of the press surface 11a of the indenter 11. The indenter set 10 is held by the indenter holder 45K such that the indenter 11 and the plurality of indenters 12 are movable in a direction parallel to the first direction independently from each other on the condition that the plurality of indenters 12 are arranged around the indenter 11.

Figure 24:
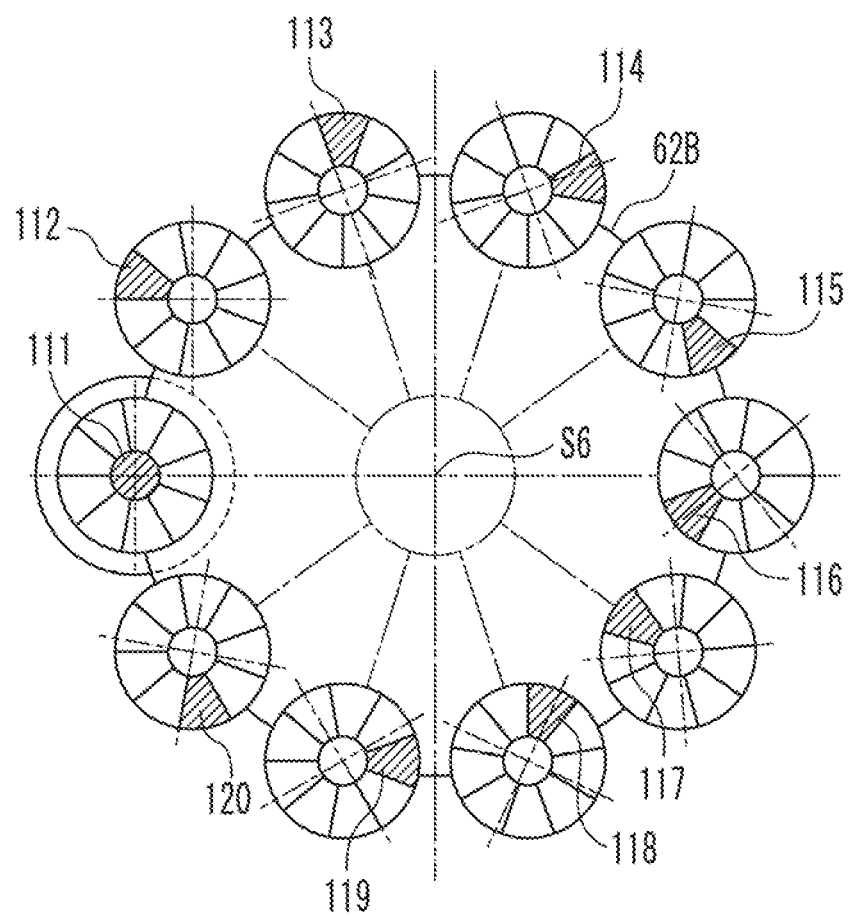
FIG. 24 is a view showing a shim assembly in a first modification of the metal member manufacturing apparatus according to the ninth embodiment, when viewed from the G direction in FIG. 22.

As shown in FIG. 24, the shim assembly 62B is provided with the shims 111 to 120. The shim 111 is a convex section with a shape corresponding to the press surface 11a. The shims 112 to 120 are convex sections with the shapes corresponding to the plurality of press surfaces 12a, respectively. The shims 111 to 120 are arranged on the circumference of the circle centering the rotation axis S6. The shim assembly 62B rotates around the rotation axis S6 and takes ten rotation positions. When the shim assembly 62B takes the first rotation position, the shim 111 is arranged between the loading block 52 and the indenter set 10. When the shim assembly 62B takes the second to tenth rotation positions, the shim 112 to 120 are respectively arranged between the loading block 52 and the indenter set 10.

A process of giving a residual stress in the first modification example will be described.

The work piece 90 has the hole formation region in which one through-hole is to be opened. The through-hole and the hole formation region are circular. The hole formation region contains ten regions. The second to tenth regions are arranged in constant intervals around the first region which is circular. Each of the second to tenth regions is arranged outside in a radial direction of the first circle of the hole formation region. The second to tenth regions are arranged in different positions from each other along a circumference of the circle of the hole formation region.

At first, the shim assembly 62B takes the first rotation position. The actuator 43K moves the first movable unit 51 toward the work piece 90. Even after the second movable unit 55 hits the work piece 90, the first movable unit 51 moves toward the work piece 90. The shim 111 comes in contact with the loading block 52 and presses the indenter 11 against the first region. The press surface 11a is pressed against the first region. After that, when the actuator 43K moves the first movable unit 51 away from the work piece 90, the second movable unit 55 is returned to the original position with the force of the spring 50 so as to form a space between the indenter 11 and the shim 111.

The shim assembly 62B rotates around the rotation axis S6 and takes the second rotation position. The actuator 43K move the first movable unit 51 toward the work piece 90. Even after the second movable unit 55 hits the work piece 90, the first movable unit 51 moves toward the work piece 90. The shim 112 comes in contact with the loading block 52 and presses the first indenter 12 against the second region. The press surface 12a of the first indenter 12 is pressed against the second region. After that, when the actuator 43K moves the first movable unit 51 away from the work piece 90, the second movable unit 55 is returned to the original position with the force of the spring 50 so as to form a space between the indenter 12 and the shim 112.

The shim assembly 62B rotates around the rotation axis S6 and takes the third rotation position. The actuator 43K moves the first movable unit 51 toward the work piece 90. Even after the second movable unit 55 hits the work piece 90, the first movable unit 51 moves toward the work piece 90. The shim 113 comes in contact with the loading block 52 and presses the second indenter 12 against the third region. The press surface 12a of the second indenter 12 is pressed against the third region. After that, when the actuator 43K moves the first movable unit 51 away from the work piece 90, the second movable unit 55 is returned to the original position with the force of the spring 50 so as to form a space between the indenter 12 and the shim 113.

In the same way, the fourth to tenth regions are pressed.

A second modification example of the metal member manufacturing apparatus according to the present embodiment will be described below.

In the second modification example, the indenter set 20 is replaced with the indenter set 30, and the shim assembly 62A is replaced with a shim assembly 62C.

Figure 25:
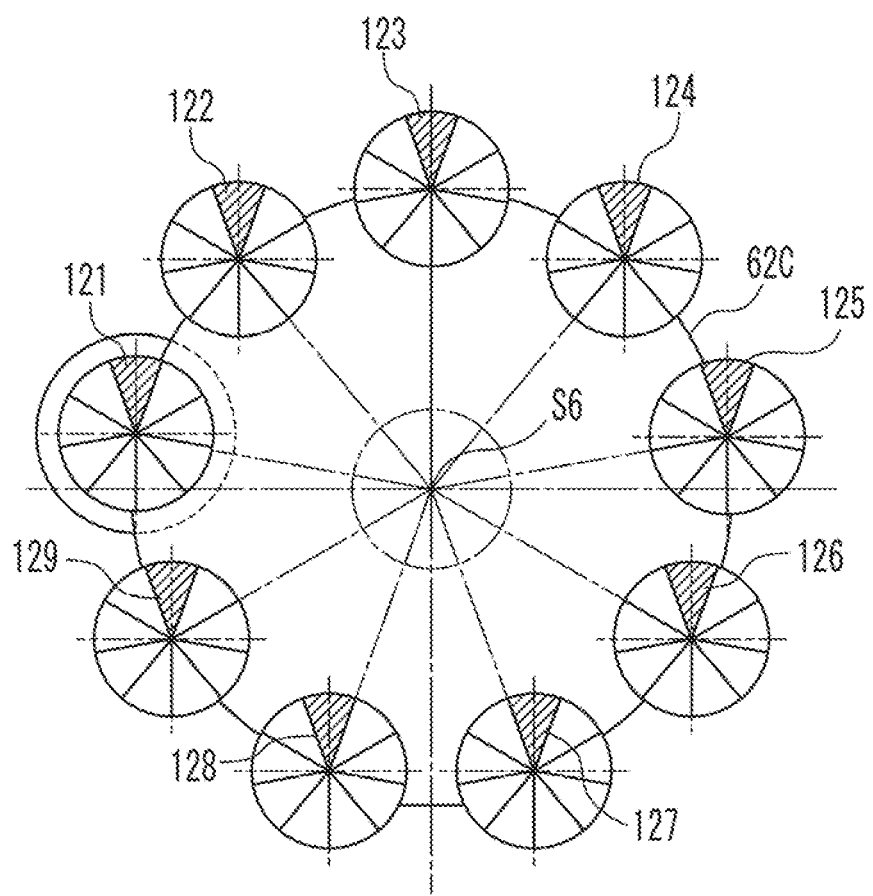
FIG. 25 is a view showing a shim assembly in a second modification of the metal member manufacturing apparatus according to the ninth embodiment, when viewed from the G direction in FIG. 22.

As shown in FIG. 25, the shim assembly 62C is provided with the shim 121 to 129 as convex sections. The shims 121 to 129 are arranged on the circumference of the circle centering the rotation axis S6. The shim assembly 62C rotates around the rotation axis S6 and takes nine rotation positions. When the shim assembly 62C takes the first rotation position, the shim 121 is arranged between the loading block 52 and the indenter set 30. When the shim assembly 62C takes second to ninth rotation positions, the shim 122 to 129 are respectively arranged between the loading block 52 and the indenter set 30.

A process of giving a residual stress in the second modification example will be described.

The work piece 90 has the hole formation region in which one through-hole is to be opened. The through-hole and the hole formation region are circular. The hole formation region contains nine regions. The nine regions are arranged in constant intervals along the circumference of the hole formation region.

At first, the shim assembly 62C takes the first rotation position. The actuator 43K moves the first movable unit 51 toward the work piece 90. Even after the second movable unit 55 hits the work piece 90, the first movable unit 51 moves toward the work piece 90. The shim 121 comes in contact with the loading block 52 and presses the first indenter 31 against the first region. The press surface 31a of the first indenter 31 is pressed against the first region. After that, when the actuator 43K moves the first movable unit 51 away from the work piece 90, the second movable unit 55 is returned to the original position with the force of the spring 50 so as to form a space between the first indenter 31 and the shim 121.

The shim assembly 62C rotates around the rotation axis S6 and takes the second rotation position. The actuator 43K moves the first movable unit 51 toward the work piece 90. Even after the second movable unit 55 hits the work piece 90, the first movable unit 51 moves toward the work piece 90. The shim 122 comes in contact with the loading block 52 and presses the second indenter 31 against the second region. The press surface 31a of the second indenter 31 is pressed against the second region. After that, when the actuator 43K moves the first movable unit 51 away from the work piece 90, the second movable unit 55 is returned to the original position with the force of the spring 50 so as to form a space between the second indenter 31 and the shim 122.

In the same way, the third to ninth regions are pressed.

In the present embodiment, when the indenter is divided into many divisions, a problem is possibly happened that all the shims cannot be provided for the assembly because the shim assembly 62 becomes too large. For example, this problem can be solved by dividing the shim assembly into two, and setting the divided shim assemblies to two units 4F. In this case, it is desirable to combine a carrying unit 70 to be described later, or a unit which controls the position of the work piece 90 so that the pressed regions formed by two units 4F come to the same position.

It should be noted that in the present embodiment, in a condition that the metal block 99 is pushed to the back surface 92, the unit 4F may press against the work piece 90 from the single side of the front surface 91 to give the residual stress to the work piece 90.

Tenth Embodiment

Figure 26:
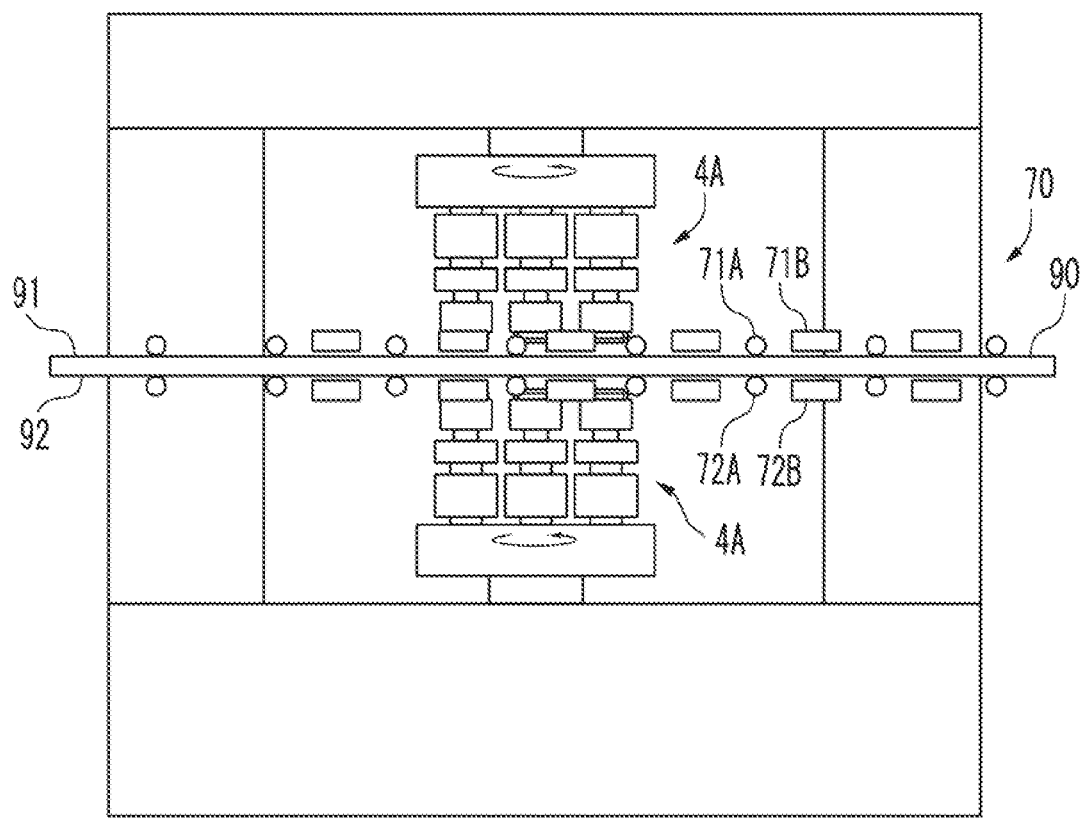
FIG. 26 is a side view of the metal member manufacturing apparatus according to a tenth embodiment of the present invention.

The metal member manufacturing apparatus according to a tenth embodiment of the present invention will be described with reference to FIG. 26. The metal member manufacturing apparatus in the present embodiment is provided with the unit 4A which presses against the work piece 90 from the side of the front surface 91, the unit 4A which presses against the work piece 90 from the side of the back surface 92, and a carrying unit 70. The carrying unit 70 includes second direction rollers 71A and 72A which send the work piece 90 into the second direction perpendicular to the above-mentioned first direction, and third direction rollers 71B and 72B which send the work piece 90 into the third direction perpendicular to the first direction and the second direction. The rotation axes of the second direction rollers 71A and 72A and those of the third direction rollers 71B and 72B are perpendicular to each other. The second direction roller 71A and the third direction roller 71B are arranged on the side of the front surface 91 of the work piece 90. The second direction roller 72A and the third direction roller 72B are arranged on the side of the back surface 92 of the work piece 90. The first direction is parallel to the direction of thickness of the work piece 90. The second direction is parallel to the longitudinal direction of the work piece 90. The third direction is parallel to the lateral direction of the work piece 90.

The lower unit 4A to press from the side of the back surface 92 of the work piece 90 may be replaced with the metal block 99.

In the present embodiment, the unit 4A can be replaced with either of the units 4B to 4F.

Eleventh Embodiment

Figure 27:
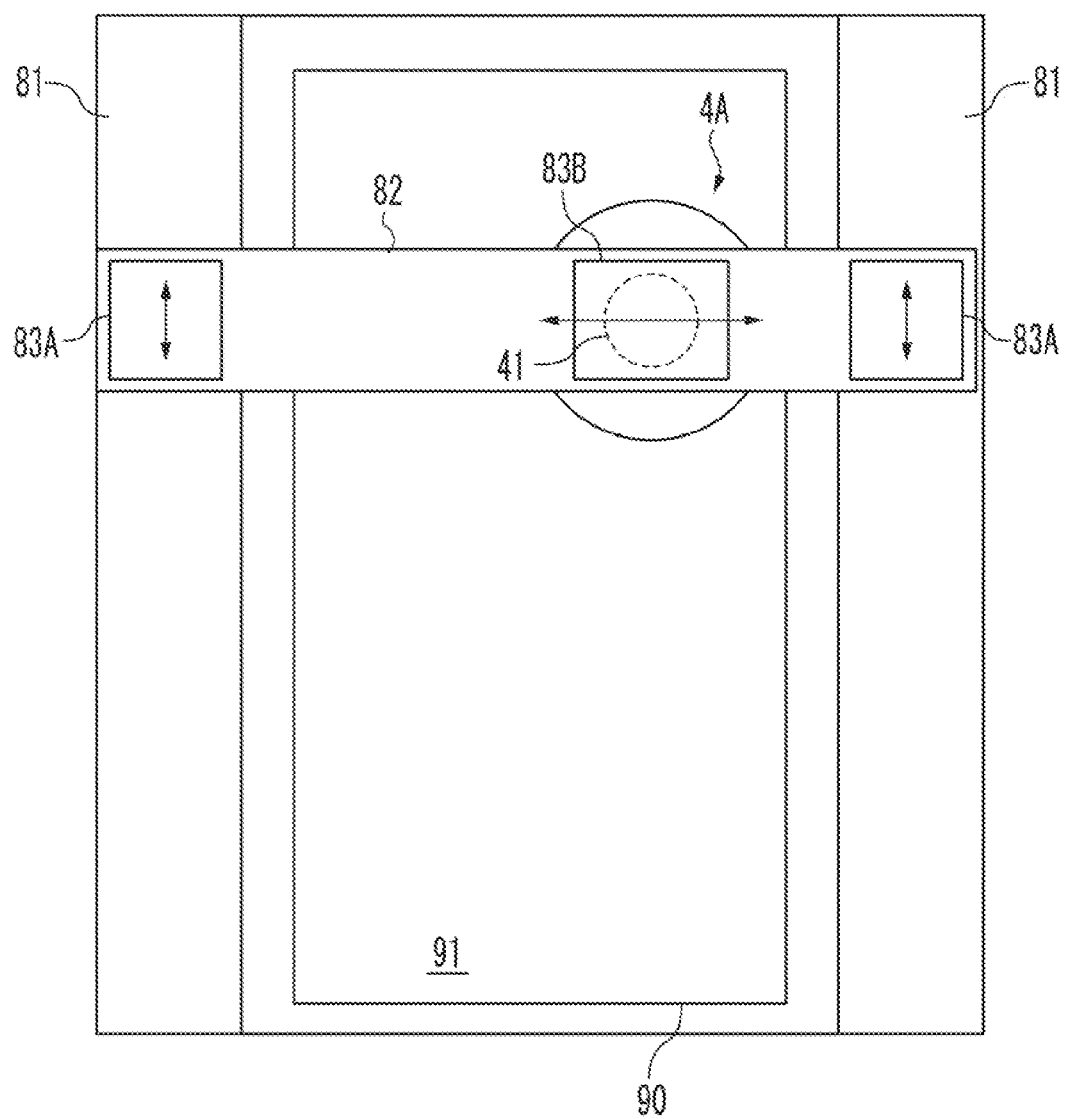
FIG. 27 is a plan view of the metal member manufacturing apparatus according to an eleventh embodiment of the present invention.

The metal member manufacturing apparatus according to the eleventh embodiment of the present invention will be described with reference to FIG. 27. The metal member manufacturing apparatus according to the present embodiment includes the unit 4A which presses against the work piece 90 from the side of the front surface 91, a guide 81 extending to a second direction perpendicular to the above-mentioned first direction, a beam 82 extending to a third direction perpendicular to the first direction and the second direction, and moving units 83A and 83B. The base rod 41 of the unit 4A is attached to the moving unit 83B. The moving unit 83A moves the beam 82 along the guide 81. The moving unit 83B moves the base rod 41 along the beam 82. The first direction is parallel to the thickness direction of the work piece 90. The second direction is parallel to the longitudinal direction of the work piece 90. The third direction is parallel to the lateral direction of the work piece 90.

In the present embodiment, the unit 4A can be replaced with either of the units 4B to 4F.

The present invention is applicable to a case where a hole of another shape such as a square is formed, in addition to a case where the circular hole is formed, if the shape of the indenter is changed.

The above embodiments may be combined optionally.

While the present invention has been described by use of the above embodiments, the present invention is not limited to the above embodiments. Various modifications can be applied to the above embodiments.

This application claims a priority based on Japanese Patent Application No. 2008-250258 filed on Sep. 29, 2008, and the disclosure thereof is incorporated herein by reference.

The invention claimed is:

1. A metal member manufacturing apparatus comprising:
    a first turntable configured to rotate around a first rotation axis parallel to a first direction as a press direction;
    a first indenter attached to said first turntable;
    a first actuator configured to move said first indenter in the first direction to press said first indenter to a metal material;
    a first load cell configured to measure a load acting on said first indenter;
    a second turntable configured to rotate around a second rotation axis parallel to the first direction;
    a second indenter attached to said second turntable movable in the first direction;
    a second actuator configured to move said second indenter in the first direction to press said second indenter against the metal material; and
    a second load cell configured to measure a load acting on said second indenter,
    wherein the metal material has a hole formation region in which one through-hole is to be opened,
    wherein said hole formation region comprises a first region and a second region,
    wherein said first indenter comprises a first press surface which is off-centered from the first rotation axis,
    wherein said first actuator presses said first press surface against the first region when said first turntable is in a first rotation position, and presses said first press surface against the second region when said first turntable is in a second rotation position different from the first rotation position,
    wherein said first turntable is attached to said second turntable to be rotatable around the first rotation axis,
    wherein the first rotation axis is arranged on a circumference of a circle centering the second rotation axis,
    wherein said second indenter comprises a second press surface which is circular, and
    wherein a central axis of said second press surface is parallel to the first direction, passes through a center of said second press surface, and is arranged on the circumference of the circle centering the second rotation axis.

2. The metal member manufacturing apparatus according to claim 1, further comprising:
    a drill attached to said second turntable,
    wherein a rotation axis of said drill is positioned on the circumference of the circle to be parallel to the first direction.

3. The metal member manufacturing apparatus according to claim 2, further comprising:
    a reamer attached to said second turntable,
    wherein a rotation axis of said reamer is positioned on the circumference of the circle to be parallel to the first direction.

4. The metal member manufacturing apparatus according to claim 1, further comprising:
    a guide extending into a second direction perpendicular to the first direction;
    a beam extending in a third direction perpendicular to the first direction and the second direction;
    a base rod attached to said beam movable along said beam;
    a first drive unit configured to move said beam along said guide; and
    a second drive unit configured to move said base rod along said beam,
    wherein said second turntable is attached to said base rod to be rotatable around the second rotation axis.

5. A metal member manufacturing method performed by a metal member manufacturing apparatus according to claim 1, the metal member manufacturing method comprising:
    pressing said first press surface against the first region of the metal material by said first actuator without pressing against the second region of said metal material when said first turntable is in the first rotation position; and
    pressing said first press surface against the second region of the metal material by said first actuator without pressing against the first region of said metal material, when said first turntable is in the second rotation position different from the first rotation position.

6. The metal member manufacturing method according to claim 5, wherein said hole formation region has a shape of a circle, and wherein the second region is arranged in a different position from the first region along a circumference of the circle.

7. The metal member manufacturing method according to claim 6, wherein said hole formation region comprises a third region outside the first region and the second region in a radial direction of the circle, and
    wherein said metal member manufacturing method further comprises:
    pressing against the third region without pressing against the first region and the second region.

8. The metal member manufacturing method according to claim 5, further comprising:
    opening the through-hole in said hole formation region.

9. A metal member manufacturing apparatus comprising:
    a first turntable configured to rotate around a first rotation axis parallel to a first direction as a press direction;
    a first indenter attached to said first turntable;
    a first actuator configured to move said first indenter in the first direction to press said first indenter to a metal material;
    a first load cell configured to measure a load acting on said first indenter;
    a guide extending into a second direction perpendicular to the first direction;

a beam extending in a third direction perpendicular to the first direction and the second direction;
a base rod attached to said beam movable along said beam;
a first drive unit configured to move said beam along said guide; and
a second drive unit configured to move said base rod along said beam,
wherein the metal material has a hole formation region in which one through-hole is to be opened,
wherein said hole formation region comprises a first region and a second region,
wherein said first indenter comprises a first press surface which is off-centered from the first rotation axis,
wherein said first actuator presses said first press surface against the first region when said first turntable is in a first rotation position, and presses said first press surface against the second region when said first turntable is in a second rotation position different from the first rotation position, and
wherein said first turntable is attached to said base rod to be rotatable around the first rotation axis.

10. A metal member manufacturing apparatus comprising:
a first turntable configured to rotate around a first rotation axis parallel to a first direction as a press direction;
a first indenter attached to said first turntable;
a first actuator configured to move said first indenter in the first direction to press said first indenter to a metal material;
a first load cell configured to measure a load acting on said first indenter; and
a carrying unit,
wherein the metal material has a hole formation region in which one through-hole is to be opened,
wherein said hole formation region comprises a first region and a second region,
wherein said first indenter comprises a first press surface which is off-centered from the first rotation axis,
wherein said first actuator presses said first press surface against the first region when said first turntable is in a first rotation position, and presses said first press surface against the second region when said first turntable is in a second rotation position different from the first rotation position, and
wherein said carrying unit comprises:
a first roller configured to carry said metal material into a second direction perpendicular to the first direction; and
a second roller configured to carry said metal material into a third direction perpendicular to the first direction and the second direction.

11. A metal member manufacturing apparatus comprising:
a turntable configured to rotate around a first rotation axis parallel to a first direction;
a first indenter attached to said turntable movable into the first direction;
a first actuator configured to move said first indenter into the first direction to press said first indenter against said metal material;
a first load cell configured to measure a load acting on said first indenter;
a second indenter attached to said turntable movable into the first direction;
a second actuator configured to move said second indenter into the first direction to press said second indenter against said metal material; and
a second load cell configured to measure a load acting on said second indenter,
wherein said first indenter comprises a first press surface which is circular,
wherein said second indenter comprises a second press surface having a shape surrounded by a first circumference of a first circle and a second circumference of a second circle which is concentric with the first circle and which is larger than the first circle,
wherein a central axis of said first press surface passes through a center of said first press surface, is parallel to the first direction, and is arranged on a circumference of a circle centering the first rotation axis,
wherein a central axis of said second press surface passes through a center of said second press surface, is parallel to the first direction, and is arranged on the circumference of the circle,
wherein said metal material comprises a hole formation region in which one through-hole is to be opened,
wherein said hole formation region comprises a first region and second regions provided around the first region,
wherein said first actuator presses said first press surface against the first region when said turntable is in the first rotation position, and said second actuator presses said second press surface against the second region when said turntable is in the second rotation position which is different from the first rotation position.

12. The metal member manufacturing apparatus according to claim 11, further comprising a carrying unit,
wherein said carrying unit comprises:
a first roller configured to carry said metal material into a second direction which is perpendicular to the first direction, and
a second roller configured to carry said metal material into a third direction which is perpendicular to the first direction and the second direction.

13. A metal member manufacturing apparatus comprising:
an indenter set comprising a first indenter and a second indenter;
an indenter holder configured to hold said indenter set such that said first indenter and said second indenter are independently movable into a first direction;
a loading block;
an actuator configured to move said loading block into the first direction; and
a shim exchange unit,
wherein said indenter set is arranged between said loading block and said metal material,
wherein said metal material has a hole formation region in which one through-hole is to be opened,
wherein said hole formation region comprises a first region and a second region,
wherein when said shim exchange unit arranges a first shim between said loading block and said indenter set, said actuator moves said loading block toward said metal material, and said first shim comes in contact with said loading block and presses said first indenter against the first region,
wherein when said shim exchange unit arranges a second shim between said loading block and said indenter set, said actuator moves said loading block toward said metal material, and said second shim comes in contact with said loading block and presses said second indenter against the second region.

14. The metal member manufacturing apparatus according to claim 13, wherein said first indenter comprises a first press surface which is pressed against the first region, and said second indenter comprises a second press surface which is pressed against the second region, and wherein each of said first press surface and said second press surface has a shape obtained by dividing a circle into a circumferential direction.

15. The metal member manufacturing apparatus according to claim 14, wherein said hole formation region comprises a third region, and said indenter set comprises a third indenter,
   wherein said indenter holder bundles up said indenter set such that said first indenter, said second indenter and said third indenter are independently movable into the first direction,
   wherein said first indenter and said second indenter are arranged around said third indenter,
   wherein when said shim exchange unit positions a third shim between said loading block and said indenter set, said actuator moves said loading block toward said metal material, and said third shim comes in contact with said loading block and presses said third indenter against the third region,
   wherein said third indenter comprises a third press surface which is pressed against the third region, and said third press surface is circular.

16. The metal member manufacturing apparatus according to claim 13, further comprising a carrying unit,
   wherein said carrying unit comprises:
   a first roller configured to carry said metal material into a second direction which is perpendicular to the first direction; and
   a second roller configured to carry said metal material into a third direction which is perpendicular to the first direction and the second direction.

* * * * *